United States Patent
Matsumoto et al.

(10) Patent No.: US 7,351,785 B2
(45) Date of Patent: Apr. 1, 2008

(54) POLY (LACTIC ACID) BASE POLYMER COMPOSITION, MOLDING THEREOF AND FILM

(75) Inventors: Taisei Matsumoto, Otsu (JP); Hiroshi Shinnumadate, Otsu (JP); Sadanori Kumazawa, Nagoya (JP); Masahiro Kimura, otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/517,999

(22) PCT Filed: Jun. 19, 2003

(86) PCT No.: PCT/JP03/07808

§ 371 (c)(1),
(2), (4) Date: Jan. 11, 2005

(87) PCT Pub. No.: WO04/000939

PCT Pub. Date: Dec. 31, 2003

(65) Prior Publication Data

US 2005/0182201 A1    Aug. 18, 2005

(30) Foreign Application Priority Data

Jun. 20, 2002  (JP) .............................. 2002-179806

(51) Int. Cl.
*C08G 63/08*    (2006.01)

(52) U.S. Cl. .................... 528/354; 428/34.1; 428/35.7; 428/411.1

(58) Field of Classification Search ............. 428/411.1, 428/34.1, 35.7; 528/354
See application file for complete search history.

(56) References Cited

U.S. PATENT DOCUMENTS

| | | | | |
|---|---|---|---|---|
| 5,849,401 | A | * 12/1998 | El-Afandi et al. | .......... 428/215 |
| 6,114,495 | A | * 9/2000 | Kolstad et al. | ............. 528/354 |
| 2002/0028857 | A1 | * 3/2002 | Holy | .......................... 523/124 |
| 2002/0198332 | A1 | 12/2002 | Kasemura et al. | |

FOREIGN PATENT DOCUMENTS

| | | | |
|---|---|---|---|
| EP | 0 980 894 A1 | | 2/2000 |
| JP | 07205278 | * | 1/1996 |
| JP | 08253665 | * | 1/1996 |
| JP | 8-253665 A | | 10/1996 |
| WO | 02/06400 A1 | | 1/2002 |

* cited by examiner

*Primary Examiner*—Terressa Boykin
(74) *Attorney, Agent, or Firm*—DLA Piper US LLP

(57) ABSTRACT

Poly(lactic acid) polymer compositions each contain an appropriate poly(lactic acid) polymer and a suitable plasticizer having a polyether and/or polyester segment in combination. The composition exhibit satisfactory flexibility and show very small amount of the evaporation, migration and extraction (bleedout) of the plasticizer and losing transparency upon heating. The poly(lactic acid) polymer compositions are useful as formed plastics such as films.

15 Claims, No Drawings

POLY (LACTIC ACID) BASE POLYMER COMPOSITION, MOLDING THEREOF AND FILM

TECHNICAL FIELD

This disclosure relates to a poly(lactic acid) polymer composition, formed plastics thereof and a film. More specifically, it relates to a poly(lactic acid) polymer composition which exhibits flexibility by the action of a plasticizer, is free from problems such as evaporation, migration and extraction (bleedout) of the plasticizer and/or losing transparency upon heating and has excellent durability in use. It also relates to formed plastics thereof and a film.

BACKGROUND ART

Plastic wastes have been disposed typically by incineration or landfilling. However, formation and discharge of harmful by-products produced as a result of incineration, reduction of landfill space and environmental pollution caused by unauthorized dumping have become significant. With an increasing public concern on disposal of plastic wastes, research and development on biodegradable plastics such as aliphatic polyesters have been increasingly carried out. Such biodegradable plastics are decomposed by the action enzymes or microorganisms. Among the biodegradable aliphatic polyesters, poly(lactic acid)s have been aggressively investigated and developed.

The poly(lactic acid)s are polymers produced by preparing lactic acid typically from a starch derived from corns or potatoes and subjecting lactic acid to chemical synthesis. The poly(lactic acid)s exhibit superior mechanical properties, heat resistance and transparency among aliphatic polyesters. Research and development to provide formed plastics of poly(lactic acid)s, such as films, sheets, tapes, fibers, ropes, nonwoven fabrics and packages, have been increasingly carried out. The poly(lactic acid)s as intact, however, have insufficient flexibility, and plasticizers are used to increase the flexibility of poly(lactic acid)s for use as, for example, packaging wrap films, stretch films and agricultural mulch films.

Japanese Unexamined Patent Application Publication No. 4-335060 discloses a technique of using a plasticizer such as a phthalic ester which is generally used in vinyl chloride polymers. When a regular plasticizer such as a phthalic ester is added to give flexibility to a poly(lactic acid), the resulting formed plastics exhibits flexibility immediately after addition. However, if the formed plastics is left in normal atmosphere (atmosphere of the air) particularly at high temperatures over a long time, the formed plastics exhibits remarkably reduced flexibility and deteriorated transparency because the plasticizer in the formed plastics evaporates and bleeds out. In addition, when a regular plasticizer is added to give flexibility to a poly(lactic acid), the formed plastics exhibits remarkably reduced flexibility and decreased transparency in water, particularly in hot water, because the plasticizer is extracted.

U.S. Pat. Nos. 5,180,765 and 5,076,983, and Japanese Unexamined Patent Application Publication No. 6-306264 each disclose a technique of using lactic acid, a linear lactic acid oligomer or a cyclic lactic acid oligomer as a plasticizer. A poly(lactic acid) cont formed plastics aining a considerable amount of lactic acid, a linear lactic acid oligomer or a cyclic lactic acid oligomer, however, exhibits poor thermal stability upon forming and is easily hydrolyzed under regular conditions for use. Formed plastics such as a film prepared from such a composition exhibits decreased strength in a relatively short time and is significantly insufficient in practical utility as formed plastics.

Japanese Unexamined Patent Application Publication No. 8-199052 discloses a technique on a composition including a poly(lactic acid)/poly(alkylene ether) copolymer, and a plasticizer mainly comprising a poly(alkylene ether). According to this technique, however, the evaporation, migration and extraction (bleedout) of the plasticizer are not sufficiently controlled, although the composition exhibits flexibility at practical level.

Japanese Unexamined Patent Application Publication No. 8-253665 discloses a composition containing a polymer mainly comprising lactic acid, and a block copolymer between a poly(alkylene ether) and a poly(lactic acid). This technique is achieved in order to impart antistatic property, and the block copolymer containing the poly(lactic acid) component is added as an antistatic agent. The publication indicates that the poly(lactic acid) component serves to increase chemical affinity of the block copolymer for a base material (matrix) to thereby make the the block copolymer finely dispersed. The publication, however, gives neither indication on the other actions of the poly(lactic acid) component nor concrete suggestion on the molecular weight thereof. The present inventors have double-checked the descriptions of Japanese Unexamined Patent Application Publication No. 8-253665 from the viewpoints of the flexibility of the composition, and control (prevention) of the evaporation, migration and extraction (bleedout) of the additive (plasticizer) and losing transparency upon heating as formed plastics. But the present inventors have found that these properties are insufficient.

As is described above, attempts have been made to give the flexibility to a poly(lactic acid) by adding a plasticizer. No technique, however, has been achieved to impart sufficient flexibility to a poly(lactic acid) and to control the evaporation, migration and extraction (bleedout) of the plasticizer and losing transparency upon heating in use as formed plastics.

Attempts have also been made to provide techniques for imparting typically flexibility to a poly(lactic acid) film having transparency and heat resistance to thereby use it as a trash bag or agricultural film, and techniques for imparting typically flexibility and adhesion to a poly(lactic acid) film to thereby use it as a packaging wrap film.

For use as packaging wrap films, Japanese Unexamined Patent Application Publication No. 2000-26623, for example, discloses a stretched film comprising a composition containing a liquid additive and a resin mainly containing an aliphatic lactic acid-based polyester. The present inventors have made an actual attempt to form a stretched film in accordance with the examples described in Japanese Unexamined Patent Publication No. 2000-26623. The resulting stretched film exhibits flexibility, heat-resistance and transparence at certain levels as a packaging wrap film for food packaging only immediately after film formation. The film, however, loses its flexibility and adhesion and lacks practical utility after use or storage at room temperature for about several weeks, since the liquid additive readily evaporates, bleeds out and attaches to a substance to be wrapped.

As is described above, no packaging wrap film comprising a poly(lactic acid) polymer composition being excellent in flexibility, transparency, heat resistance and adhesion has yet been realized.

SUMMARY

We provide of a first embodiment including a poly(lactic acid) polymer composition comprising a poly(lactic acid) polymer exhibiting crystallinity and a plasticizer, in which the plasticizer has at least one poly(lactic acid) segment having a molecular weight of 1200 or more per molecule and comprises a polyether and/or polyester segment.

We provide of a second embodiment including a poly (lactic acid) polymer composition comprising a poly(lactic acid) polymer exhibiting crystallinity, a poly(lactic acid) polymer exhibiting no crystallinity, and a plasticizer, in which the plasticizer comprises a polyether and/or polyester segment and has no poly(lactic acid) segment having a molecular weight of 1200 or more.

We provide of a third embodiment including a poly(lactic acid) polymer composition comprising a poly(lactic acid) polymer exhibiting crystallinity and having a melting point lower than 145° C., and a plasticizer, in which the plasticizer comprises a polyether and/or polyester segment and has no poly(lactic acid) segment having a molecular weight of 1200 or more.

In addition, we provide of a fourth embodiment including a poly(lactic acid) polymer composition comprising a poly (lactic acid) polymer exhibiting no crystallinity, and a plasticizer, the composition containing no poly(lactic acid) polymer exhibiting crystallinity, in which the plasticizer comprises a polyether and/or polyester segment.

The poly(lactic acid) polymer compositions have sufficient flexibility and show very small amount of the evaporation, migration and extraction (bleedout) of plasticizers and losing transparency upon heating in use as formed plastics.

DETAILED DESCRIPTION

Poly(lactic acid) polymers for use in the poly(lactic acid) polymer compositions of the first, second, third and fourth embodiments are poly(lactic acid) polymers each mainly comprising L-lactic acid and/or D-lactic acid and containing components derived from lactic acid in an amount of 70 percent by weight or more of the total of the polymer. Homopoly(lactic acid)s substantially comprising L-lactic acid and/or D-lactic acid are preferably used as the poly (lactic acid) polymers.

In general, such homopoly(lactic acid)s each have an elevating melting point and increasing crystallinity with an increasing optical purity. The melting point and crystallinity of a poly(lactic acid) are affected by its molecular weight and a catalyst used in polymerization. A homopoly(lactic acid) having an optical purity of 98% or more, for example, generally has a melting point of about 170° C. and exhibits relatively high crystallinity. The melting point and crystallinity decrease with a decreasing optical purity. A homopoly (lactic acid) having an optical purity of 88%, for example, has a melting point of about 145° C., and a homopoly(lactic acid) having an optical purity of 75% has a melting point of about 120° C. A homopoly(lactic acid) having an optical purity lower than 70% does not have a clear melting point and is amorphous.

The phrase "a poly(lactic acid) polymer exhibits crystallinity" means that heat of fusion of crystal derived from a poly(lactic acid) component is observed when the poly (lactic acid) polymer is sufficiently crystallized under heating and is then subjected to measurement using a differential scanning calorimeter (DSC) in an appropriate temperature range.

A lactide process and a direct polymerization process are known as processes for producing a poly(lactic acid). According to the lactide process, a poly(lactic acid) is produced in two steps, i.e., by preparing a lactide, a cyclic dimer, from L-lactic acid, D-lactic acid or DL-lactic acid (racemate) as a raw material, and subjecting the lactide to ring-opening polymerization. According to the direct polymerization process, a poly(lactic acid) is produced in one step of subjecting the raw material to direct dehydration condensation in a solvent. The homopoly(lactic acid) can be prepared by any of the production processes. A homopoly (lactic acid) prepared by the direct polymerization process is substantially free from problems caused by the cyclic dimer and is suitable from the viewpoints of formability and film-forming property. In a polymer prepared by the lactide process, the cyclic dimer contained therein evaporates during forming and causes deposition on a cast drum upon melting film formation or decreased smoothness of the surface of the resulting film. The content of the cyclic dimer in the polymer before forming or melting film formation is preferably controlled to 0.3 percent by weight or less.

The weight-average molecular weight of the poly(lactic acid) polymer is generally at least 50000, preferably 80000 to 300000, and more preferably 100000 to 200000. When the average molecular weight is set at 50000 or more, the resulting formed plastics such as a film exhibits satisfactory physical properties in strength.

The poly(lactic acid) polymer may be a lactic acid copolymer prepared by copolymerizing another monomer component capable of forming an ester, in addition to L-lactic acid and/or D-lactic acid. Examples of such copolymerizable monomer component are hydroxycarboxylic acids such as glycolic acid, 3-hydroxybutyric acid, 4-hydroxybutyric acid, 4-hydroxyvaleric acid and 6-hydroxycaproic acid; compounds each having plural hydroxyl groups in the molecule, and derivatives thereof, such as ethylene glycol, propylene glycol, butanediol, neopentyl glycol, poly(ethylene glycol)s, glycerol and pentaerythritol; compounds each having plural carboxylic acids in the molecule and derivatives thereof, such as succinic acid, adipic acid, sebacic acid, fumaric acid, terephthalic acid, isophthalic acid, 2,6-naphthalenedicarboxylic acid, 5-sodiosulfoisophthalic acid and 5-tetrabutylphosphonium sulfoisophthalate. The copolymeric component of the poly(lactic acid) polymer is preferably selected from among biodegradable components.

The plasticizers for use in the poly(lactic acid) polymer compositions of the first, second, third and fourth embodiments each comprise a polyether and/or polyester segment.

Such compounds comprising a polyether and/or polyester segment have relatively high affinity for a poly(lactic acid) and highly efficiently serve to plasticize the poly(lactic acid). By introducing a polyether and/or polyester segment into the plasticizer, the flexibility can be imparted to the poly(lactic acid).

The plasticizers for use in the poly(lactic acid) polymer compositions of the first, second, third and fourth embodiments preferably comprise polyether segments, of which poly(alkylene ether) segments are more preferred, of which poly(ethylene glycol) segments are typically preferred.

When the plasticizers have segments comprising a poly (alkylene ether) such as a poly(ethylene glycol), poly(propylene glycol) or poly(ethylene glycol)/poly(propylene glycol) copolymer, particularly poly(ethylene glycol), they have especially high affinity for a poly(lactic acid) polymer and highly efficiently serve to plasticize the poly(lactic acid) polymer. Thus, a poly(lactic acid) polymer composition having a desired flexibility can be prepared by the addition of the plasticizer in a small amount.

When the plasticizers have the segment comprising a poly(alkylene ether), especially poly(ethylene glycol), the average molecular weight of the segment is preferably 1000 or more, and more preferably 2000 or more. By setting the average molecular weight at 1000 or more, the evaporation of the plasticizer can be highly prevented. The average molecular weight is generally at highest 500,000 or less and is preferably 20000 or less. When an average molecular weight is 50000 or less, the affinity for the poly(lactic acid) polymer increases and the plasticizing efficiency remarkably increases.

When the plasticizer contains a segment comprising a poly(alkylene ether), an antioxidant such as a hindered phenol or hindered amine antioxidant and/or a thermal stabilizer such as a phosphorus thermal stabilizer as described later is preferably used, since the poly(alkylene ether) segment is susceptible to oxidation and thermal decomposition upon heating typically in forming.

The poly(lactic acid) polymer composition of the first embodiment will be described below.

The poly(lactic acid) polymer composition of the first embodiment is a poly(lactic acid) polymer composition comprising a poly(lactic acid) polymer exhibiting crystallinity and a plasticizer, in which the plasticizer has at least one poly(lactic acid) segment having a molecular weight of 1200 or more per molecule and comprises a polyether and/or polyester segment.

When a homopoly(lactic acid) is used in the poly(lactic acid) polymer composition of the first embodiment, the homopoly(lactic acid) may have an optical purity of 75% or more. If the poly(lactic acid) polymer for use in the poly (lactic acid) polymer composition of the first embodiment exhibits no crystallinity, the evaporation, migration and extraction (bleedout) of the plasticizer is not sufficiently controlled.

The poly(lactic acid) polymer composition of the first embodiment comprises a plasticizer that comprises a polyether and/or polyester segment and has, per molecule, at least one poly(lactic acid) segment having a molecular weight of 1200 or more.

The poly(lactic acid) segment in the plasticizer is preferably 1500 or more. By setting the poly(lactic acid) segment of the plasticizer at 1500 or more, the poly(lactic acid) segment in the plasticizer is incorporated into crystals comprising the matrix poly(lactic acid) polymer and serves to anchor the molecule of the plasticizer to the matrix. Thus, the evaporation, migration and extraction (bleedout) of the plasticizer can be prevented at high levels.

A poly(lactic acid) segment having a molecular weight of 10,000 or more in the plasticizer may decrease the plasticizing efficiency of the plasticizer, which in turn prevents the impartment of-practical flexibility.

The plasticizer for use in the poly(lactic acid) polymer composition of the first embodiment comprises a poly(lactic acid) segment exhibiting crystallinity. The heat of fusion of crystal ($\Delta H_{po}$) derived from the poly(lactic acid) segment of the plasticizer as determined by measurement using a DSC is preferably 3.0 J/g or more, more preferably 10.0 J/g or more, and further preferably 20.0 J/g or more. The measuring process of $\Delta H_{po}$ is described in the examples.

In the plasticizer for use in the poly(lactic acid) polymer composition, the compositional ratio of the L-lactic acid component to the D-lactic acid component constituting the poly(lactic acid) segment is preferably 100:0 to 95:5 or 5:95 to 0:100. The plasticizer having such a compositional ratio can yield a poly(lactic acid) polymer composition that is specifically free from the evaporation, migration and extraction (bleedout) of the plasticizer.

The poly(lactic acid) polymer composition of the first embodiment preferably further comprises a poly(lactic acid) polymer exhibiting no crystallinity. By incorporating a poly (lactic acid) polymer exhibiting no crystallinity, losing transparency upon heating can be controlled at a higher level, in addition to the control of the evaporation, migration and extraction (bleedout) of the plasticizer.

The proportion of the poly(lactic acid) polymer exhibiting no crystallinity may be set according to the application.

In contrast to regular polyesters such as poly(ethylene terephthalate)s, poly(lactic acid) polymers hardly undergo transesterification when two or more different poly(lactic acid) polymers having, for example, different compositions, melting points or crystallinity are dry-blended to form a mixture and the mixture is subjected to melt extrusion according to a conventional procedure. Thus, the poly(lactic acid) polymer composition of the first embodiment preferably comprises a poly(lactic acid) having an optical purity of 95% or more as at least one of poly(lactic acid) polymers to be used and further comprises an amorphous poly(lactic acid) polymer exhibiting no crystallinity. This sufficiently controls the evaporation, migration and extraction (bleedout) of the plasticizer and losing transparency upon heating and yields a poly(lactic acid) polymer composition having high heat resistance.

The poly(lactic acid) polymer composition of the first embodiment can be formed into a formed plastics. The poly(lactic acid) polymer composition of the first embodiment is preferably stretched 1.1 times or more in at least one axial direction to form a formed plastics.

Stretching the formed plastics orients and crystallizes the matrix poly(lactic acid) polymer and advances the incorporation of the poly(lactic acid) segment of the plasticizer into the crystals. Thus, the evaporation, migration and extraction (bleedout) of the plasticizer can further be prevented.

Stretching the formed plastics also improves physical properties in strength of the formed plastics due to orientation and crystallization and thereby yields formed plastics having both flexibility and strength.

A nucleating agent for accelerating crystallization may be used in combination when the poly(lactic acid) polymer composition of the first embodiment is formed into a formed plastics. This may accelerate the incorporation of the poly (lactic acid) segment of the plasticizer into the crystals comprising the matrix poly(lactic acid) polymer to thereby anchor the molecule of the plasticizer to the matrix, which in turn may further control the evaporation, migration and extraction (bleedout) of the plasticizer. Examples of the nucleating agent are inorganic nucleating agents such as talc and organic nucleating agents such as erucamide.

The poly(lactic acid) polymer composition of the first embodiment comprises a plasticizer having at least one poly(lactic acid) segment having a molecular weight of 1200 or more per molecule and comprising a polyether and/or polyester segment.

The plasticizer having at least one poly(lactic acid) segment having a molecular weight of 1200 or more per molecule and comprising a polyether and/or polyester-segment can be, for example, prepared by preparing a poly (lactic acid) oligomer having a molecular weight of 1200 or more according to a conventional procedure such as lactide ring-opening or lactic acid polycondensation, and reacting the resulting poly(lactic acid) oligomer with an appropriate amount of a compound having a polyether and/or polyester segment and serving as a main component of the plasticizer. The plasticizer may be prepared as an addition polymer by ring-opening polymerization of lactide using, as a polymerization initiator, the compound serving as a main component of the plasticizer or by dehydration polycondensation of lactic acid using, as a polymerization initiator, the compound serving as a main component of the plasticizer. The plasticizer may also be prepared by allowing a bifunctional compound such as a dicarboxylic anhydride compound or a diisocyanate compound to act as a linking agent upon the poly(lactic acid) oligomer having a molecular weight of 1200 or more with the compound serving as a main component of the plasticizer in coexistence by means of a treatment such as kneading under heating to thereby chemically bond the two components.

More concrete examples of the plasticizer that has at least one poly(lactic acid) segment having a molecular weight of 1200 or more per molecule and comprises a polyether and/or polyester segment will be illustrated below.

Initially, a poly(ethylene glycol) (PEG) having terminal hydroxyl groups at both ends is prepared. The average molecular weight ($M_{PEG}$) of the poly(ethylene glycol) (PEG) having terminal hydroxyl groups at both ends is generally determined by calculation from a hydroxyl value which is determined typically according to a neutralization process in the case of a commercially available product. A total of $w_A$ parts by weight of lactide is added to $w_B$ parts by weight of the poly(ethylene glycol) (PEG) having terminal hydroxyl groups at both ends, and the lactide is subjected sufficiently to ring-opening addition polymerization to the terminal hydroxyl groups at both ends of PEG. This yields a block copolymer substantially having a PLA (A)-PEG (B)-PLA (A) configuration. This reaction may be carried out in the coexistence of a catalyst such as tin octylate according to necessity.

The number-average molecular weight of one poly(lactic acid) segment of the plasticizer comprising the block copolymer can be-substantially determined as $(1/2) \times (w_A/w_B) \times M_{PEG}$. The amount (weight percentage) of the poly (lactic acid) segment component can be substantially determined as $100 \times w_A/(w_A+w_B)$ percent of the total plasticizer. The weight percentage of the plasticizing component other than the poly(lactic acid) segment component can be substantially determined as $100 \times w_B/(w_A+w_B)$ percent of the total plasticizer.

When unreacted materials such as unreacted PEG and a PEG containing a terminal poly(lactic acid) segment having a molecular weight of less than 1200, by-products such as lactide oligomers, or impurities need to be removed, following purification processes can be applied.

The synthesized plasticizer is uniformly dissolved in an appropriate good solvent such as chloroform, and an appropriate poor solvent such as a mixture of water and methanol or diethyl ether is added dropwise thereto.

Alternatively, a solution of the plasticizer in a good solvent is added to large excess of a poor solvent to form a precipitate, the precipitate is separated typically by centrifugation or filtration, and the solvent is evaporated.

The purification process is not specifically limited to the above examples, and any of the above procedures may be repeated plural times according to necessity.

When the plasticizer comprising the PLA (A)-PEG (B)-PLA (A) block copolymer is prepared by the above process, the molecular weight of one poly(lactic acid) segment in the plasticizer can be determined in the following manner.

The plasticizer is dissolved in deuterium chloroform, and the solution is subjected to 1H-NMR measurement. The molecular weight is determined by calculation according to the following equation based on the resulting chart:

$$\text{Molecular weight} = (1/2) \times (I_{PLA} \times 72)/(I_{PEG} \times 44/4) \times M_{PEG}$$

wherein $I_{PEG}$ is the integrated intensity of signals derived from hydrogen of the methylene group of the principal chain of PEG; and $I_{PLA}$ is the integrated intensity of signals derived from hydrogen of the methine group of the principal chain of PLA.

When the plasticizer is prepared under such conditions that the lactide reacts satisfactorily and substantially all the lactide undergoes ring-opening addition to the terminals of PEG, the molecular weight is often preferably determined based on the chart obtained by 1H-NMR measurement.

The poly(lactic acid) polymer composition of the first embodiment has sufficient flexibility by using, as the plasticizer, a block copolymer having a PLA (A)-PEG (B)-PLA (A) configuration and having at least one poly(lactic acid) segment having a molecular weight of 1200 or more per molecule. The poly(lactic acid) polymer composition of the first embodiment yields formed plastics, such as a film, which shows very small amount of the evaporation, migration and extraction (bleedout) of the plasticizer.

The poly(lactic acid) polymer composition of the first embodiment has excellent durability in use and show very small amount of the evaporation, migration and extraction (bleedout) of the plasticizer.

The formed plastics, such as a film, comprising the poly(lactic acid) polymer composition of the first embodiment exhibits satisfactory durability in use at ordinary temperatures or at relatively low temperatures.

Next, the poly(lactic acid) polymer composition of the second embodiment will be illustrated below.

The poly(lactic acid) polymer composition of the second embodiment is a poly(lactic acid) polymer composition comprising a poly(lactic acid) polymer exhibiting crystallinity, a poly(lactic acid) polymer exhibiting no crystallinity, and a plasticizer, in which the plasticizer comprises a polyether and/or polyester segment and has no poly(lactic acid) segment having a molecular weight of 1200 or more.

The poly(lactic acid) polymer composition of the second embodiment essentially comprises a poly(lactic acid) polymer exhibiting crystallinity and a poly(lactic acid) polymer exhibiting no crystallinity. When the poly(lactic acid) polymer composition comprises not a poly(lactic acid) polymer exhibiting no crystallinity but a poly(lactic acid) polymer exhibiting crystallinity alone, the composition exhibits high crystallinity and the resulting formed plastics shows excessively high crystallinity. Thus, the formed plastics undergoes losing transparency in use under heating at a temperature of 100° C. or below, such as in the case where the formed plastics comes in contact with boiling water or water vapor.

When a homopoly(lactic acid) is used as the poly(lactic acid)-polymer exhibiting crystallinity in the poly(lactic acid) polymer composition of the second embodiment, the homopoly(lactic acid) preferably has an optical purity of about 75% or more.

When a homopoly(lactic acid) is used as the poly(lactic acid) polymer exhibiting no crystallinity in the poly(lactic acid) polymer composition of the second embodiment, the homopoly(lactic acid) preferably has an optical purity of less than about 70%.

The poly(lactic acid) polymer composition of the second embodiment further comprises a plasticizer. The plasticizer contained in the poly(lactic acid) polymer composition of the second embodiment comprises a polyether and/or polyester segment and does not have a poly(lactic acid) segment having a molecular weight of 1200 or more.

Next, the poly(lactic acid) polymer composition of the third embodiment will be illustrated below.

The poly(lactic acid) polymer composition of the third embodiment is a poly(lactic acid) polymer composition comprising a poly(lactic acid) polymer exhibiting crystallinity and having a melting point lower than 145° C., and a plasticizer, in which the plasticizer comprises a polyether and/or polyester segment and has no poly(lactic acid) segment having a molecular weight of 1200 or more.

The poly(lactic acid) polymer composition of the third embodiment essentially comprises a poly(lactic acid) polymer exhibiting crystallinity and having a melting point of lower than 145° C. The melting point of the poly(lactic acid) polymer herein refers to a peak temperature of crystal fusion as determined using a DSC at temperatures ranging from −30° C. to 220° C. at a temperature elevation rate of 20° C./min. If the poly(lactic acid) polymer composition of the third embodiment comprises a poly(lactic acid) polymer having a melting point of 145° C. or higher alone, the poly(lactic acid) polymer composition exhibits high crystallinity and the resulting formed plastics shows excessively high crystallinity. Thus, the formed plastics undergoes losing transparency in use under heating at a temperature of 100° C. or below, such as in the case where the formed plastics comes in contact with boiling water or water vapor.

When a homopoly(lactic acid) is used as the poly(lactic acid) polymer having a melting point of lower than 145° C., the homopoly(lactic acid) preferably has an optical purity of less than about 88%.

The plasticizer contained in the poly(lactic acid) polymer composition of the third embodiment comprises a polyether and/or polyester segment and does not have a poly(lactic acid) segment having a molecular weight of 1200 or more.

In the poly(lactic acid) polymer compositions of the first, second and third embodiments, the weight percentage of the poly(lactic acid) segment component in the plasticizer is preferably less than 50 percent by weight of the total plasticizer. By setting the weight percentage at less than 50 percent by weight based on the total weight of the plasticizer, the plasticizer shows relatively high plasticizing efficiency and can yield a poly(lactic acid) polymer composition having desired flexibility by the addition of the plasticizer in a small amount. The weight percentage of the poly(lactic acid) segment component in the plasticizer is generally 5 percent by weight or more based on the total weight of the plasticizer, while depending on configurations such as the proportion of the plasticizing component in the plasticizer molecule.

The weight percentage of the plasticizer in the poly(lactic acid) polymer compositions of the first, second and third embodiments is preferably set according to required properties such as flexibility and strength. In addition, the weight percentage of the plasticizing component other than the poly(lactic acid) segment component in the plasticizer is preferably 5 percent by weight or more and 30 percent by weight or less based on the total weight of the composition. By setting the weight percentage of the plasticizing component other than the poly(lactic acid) segment component in the plasticizer at 5 percent by weight or more and 30 percent by weight or less of the total composition, the resulting composition exhibits well-balanced mechanical properties such as flexibility and physical properties in strength.

Next, the poly(lactic acid) polymer composition of the fourth embodiment will be illustrated.

The poly(lactic acid) polymer composition of the fourth embodiment is a poly(lactic acid) polymer composition which comprises a-poly(lactic acid) polymer exhibiting no crystallinity, and a plasticizer and contains no poly(lactic acid) polymer exhibiting crystallinity, in which the plasticizer comprises a polyether and/or polyester segment.

The poly(lactic acid) polymer composition of the fourth embodiment essentially comprises a poly(lactic acid) polymer exhibiting no crystallinity. When a homopoly(lactic acid) is used as the poly(lactic acid) polymer exhibiting no crystallinity, the homopoly(lactic acid) preferably has an optical purity of less than about 70%.

The poly(lactic acid) polymer composition of the fourth embodiment does not contain a poly(lactic acid) polymer exhibiting crystallinity.

Other components than the poly(lactic acid) segment of the plasticizer for use in the poly(lactic acid) polymer composition of the fourth embodiment are preferably biodegradable components.

The poly(lactic acid) polymer composition of the fourth embodiment is especially useful in use where the resulting formed plastics must be plastically deformed at relatively low temperatures, such as a heat seal component of a multilayer film comprising a poly(lactic acid) polymer, although the composition does not have high heat resistance.

The poly(lactic acid) polymer compositions of the first, second, third and fourth embodiments may further comprise other components. Examples of such components are, for example, known or conventional plasticizers, ultraviolet stabilizers, anticoloring agents, delustering agents, deodorants, flame retardants, weathering agents, antistatics, mold releasing agents, antioxidants, ion exchanging agents, fine inorganic particles and organic compounds serving as coloring pigments.

The other components are preferably biodegradable components when used in the poly(lactic acid) polymer compositions of the first, second, third and fourth embodiments in addition to the poly(lactic acid) polymers and the plasticizer comprising a polyether and/or polyester segment.

Examples of the known plasticizers to be contained in the poly(lactic acid) polymer compositions of the first, second, third and fourth embodiments are phthalic esters such as diethyl phthalate, dioctyl phthalate and dicyclohexyl phthalate; aliphatic dibasic acid esters such as di-1-butyl adipate, di-n-octyl adipate, di-n-butyl sebacate and di-2-ethylhexyl azelate; phosphoric esters such as diphenyl-2-ethylhexyl phosphate and diphenyloctyl phosphate; hydroxy-polycarboxylic acid esters such as tributyl acetylcitrate, tri-2-ethylhexyl acetylcitrate and tributyl citrate; fatty acid esters such as methyl acetylricinoleate and amyl stearate; polyhydric alcohol esters such as glycerol triacetate and triethylene glycol dicaprylate; epoxy plasticizers such-as epoxidized soybean oil, epoxidized linseed oil fatty acid butyl ester and octyl epoxystearate; polyester plasticizers such as poly(propylene glycol) sebacic acid ester; poly(alkylene ether) plasticizers, ether ester plasticizers and acrylate plasticizers. From the viewpoint of safety, plasticizers approved by Food and Drug Administration (FDA) are preferably used.

The plasticizer is preferably added to the poly(lactic acid) polymer by adding the plasticizer to the poly(lactic acid) polymer after the completion of the polymerization reaction of the polymer, and melting and kneading the resulting mixture. This increases the degree of polymerization of the poly(lactic acid) polymer and reduces residual low-molecular-weight substances. Examples of the process for mixing, melting and kneading the plasticizer and the poly(lactic acid) polymer are a process in which the plasticizer is added to the poly(lactic acid) polymer in molten state immediately after the completion of polycondensation reaction, and the resulting mixture is agitated, melted and kneaded; a process in which the plasticizer is mixed with chips of the poly(lactic acid) polymer, and the resulting mixture is melted and kneaded typically in a drum reactor or an extruder; a process in which the plasticizer which has been liquefied, where necessary, by heating is continuously added to the poly (lactic acid) polymer in an extruder, and the resulting mixture is melted and kneaded; and a process in which master chips of the poly(lactic acid) polymer containing a high content of the plasticizer and homo-chips of the poly (lactic acid) polymer are mixed to yield blend chips, and the blend chips are melted and kneaded typically in an extruder.

Examples of the antioxidants for use in the poly(lactic acid) polymer compositions of the first, second, third and fourth embodiments are hindered phenol antioxidants and hindered amine antioxidants.

Examples of the coloring pigments for use in the poly (lactic acid) polymer compositions of the first, second, third and fourth embodiments of the present invention are inorganic pigments such as carbon black, titanium oxide, zinc oxide and iron oxide; and organic pigments such as cyanine-, styrene-, phthalocyanine-, anthraquinone-, perinone-, isoindolinone-, quinophthalone-, quinacridone- and thioindigo-based pigments.

Fine inorganic particles may be added to the poly(lactic acid) polymer compositions of the first, second, third and fourth embodiments for improving slidability (slipping property) and antiblocking property of the formed plastics. Examples of such fine inorganic particles are silica, colloidal silica, alumina, alumina sol, kaolin, talc, mica and calcium carbonate. The average particle size thereof is not specifically limited and is preferably from 0.01 to 5 μm, more preferably from 0.05 to 3 μm, and further preferably from 0.08 to 2 μm.

The poly(lactic acid) polymer compositions of the first, second, third and fourth embodiments may further comprise any of aliphatic polyesters other than the poly(lactic acid) polymers. Incorporation of aliphatic polyesters other than the poly(lactic acid) polymers reduces the melt viscosity or improves the biodegradability.

Examples of the aliphatic polyesters other than the poly (lactic acid) polymers for use in the poly(lactic acid) polymer compositions of the first, second, third and fourth embodiments are, poly(glycolic acid), poly(3-hydroxybutyrate), poly(3-hydroxybutyrate/3-hydroxyvalerate), polycaprolactone; and polyesters each comprising an aliphatic diol and an aliphatic dicarboxylic acid. Examples of the aliphatic diol are ethylene glycol and 1,4-butanediol. Examples of the aliphatic dicarboxylic acid are succinic acid and adipic acid.

The poly(lactic acid) polymer compositions of the first, second and third embodiments can be formed into formed plastics such as films and sheets from their molten or dissolved state.

The poly(lactic acid) polymer compositions of the first, second and third embodiments exhibit satisfactory flexibility, transparency and physical properties in strength and can be used in wider ranges of applications than conventional equivalents. They can be used, for example, as packaging materials such as packaging wrap films and stretch films; industrial materials such as agricultural films, films for labels, films for tapes, films for protecting base materials, sheets for protecting automobile coatings, trash bags and compost bags; packages and containers such as bottles for beverages or cosmetics, disposable caps and trays; as well as nursery cabinets and flower pots.

The poly(lactic acid) polymer compositions of the first, second and third embodiments can be formed into films according to a conventional production process of a stretched film, such as blow-extrusion (inflation), sequential biaxial stretching or simultaneous biaxial stretching.

To prepare a film by sequential biaxial stretching or simultaneous biaxial stretching, an unstretched film may be prepared by melting and extruding the poly(lactic acid) polymer composition from a slit die into a sheet according to a conventional procedure, and allowing the sheet to come in contact with a casting drum to thereby cool and solidify the composition.

For minimizing thermal degradation of the poly(lactic acid) polymer composition, the plasticizer is preferably added to the poly(lactic acid) polymer by liquefying the plasticizer typically by heating, measuring and adding the liquefied plasticizer to the poly(lactic acid) polymer melted typically in a double-screw extruder, and melting and kneading the resulting mixture. It is also acceptable that master chips of the poly(lactic acid) polymer containing a high content of the plasticizer and homo-chips of the poly(lactic acid) polymer are mixed to yield blend chips, and the blend chips are melted and kneaded typically in an extruding system of a film forming machine, such as an extruder.

To prepare a film, the above-prepared unstretched film is preferably continuously stretched in at least one direction and is subjected to thermal treatment according to necessity. A stretched film, for example, subjected to thermal treatment at a temperature of 100° C. or higher has satisfactory dimensional stability, exhibits a low thermal shrinkage and is suitable typically as packaging wrap films and agricultural films. A stretched film without thermal treatment or one subjected to thermal treatment at a temperature of lower than 100® C. has a high thermal shrinkage and is suitable as shrink packaging films.

The formed plastics, such as a film, comprising the poly(lactic acid) polymer composition of the first embodiment exhibits satisfactory durability in use at ordinary temperatures or at relatively low temperatures.

The poly(lactic acid) polymer compositions of the second, third and fourth embodiments show markedly reduced losing transparency in use under heating and exhibit satisfactory durability.

The poly(lactic acid) polymer compositions of the first, second and third embodiments are typically effective in the fields of formed plastics such as films in which the evaporation, migration and extraction (bleedout) of the plasticizer may be avoided in many cases.

When the poly(lactic acid) polymer compositions of the first, second and third embodiments, for example, are used as packaging wrap films, the packaging wrap films exhibit practically satisfactory flexibility, transparency and physical properties in strength from immediately after the beginning of use, and show very small amount of the evaporation, migration and extraction (bleedout) of the plasticizer with elapse of time in use and losing transparency in use under heating. The packaging wrap films can thereby maintain their initial flexibility and transparency over a long period of time in use. The use of a biodegradable plasticizer yields packaging wrap films that can be converted into compost without separation from the content such as food after use. The compositions exhibit satisfactory stability with time and can yield formed plastics, such as films, that can exhibit initial performance without deterioration even over a long time after the preparation. The compositions also yield formed plastics, such as films, that stably exhibit flexibility and transparency even after dry thermal processing or treatment at high temperatures in after-processing steps of the formed plastics. In addition, the resulting formed plastics do not undergo losing transparency even in use under heating.

The poly(lactic acid) polymer compositions of the first, second and third embodiments can be stretched 1.1 times or more in at least one axial direction to yield formed plastics such as films.

The films comprising the poly(lactic acid) polymer compositions of the first, second and third embodiments are often prepared by stretching the compositions 1.1 times or more in at least one axial direction. To avoid ununiform stretching under some stretching conditions such as stretching temperature and stretching (deformation) speed, the compositions are preferably stretched 2 times or more, and more preferably 2.5 times or more to yield films.

By stretching the poly(lactic acid) polymer composition of the first embodiment 1.1 times or more in at least one axial direction to yield a film, the matrix poly(lactic acid) polymer is further highly oriented and crystallized, and the poly(lactic acid) segment of the plasticizer is further incorporated into the crystal. Thus, the resulting film is further prevented from the evaporation, migration and extraction (bleedout) of the plasticizer. The orientation and crystallization also improves the physical properties in strength of the film, and the film exhibits both satisfactory flexibility and strength.

To prepare biaxially stretched films from the poly(lactic acid) polymer compositions of the first, second and third embodiments, the compositions are stretched preferably 4 times or more, and more preferably 7 times or more in terms of areal magnification ratio a s an areal ratio of the film between before and after stretching.

The films derived from the poly(lactic acid) polymer compositions of the first, second and third embodiments preferably each have a tensile modulus of elasticity of 100 to 1500 MPa. The tensile modulus of elasticity of such a film can be set at a desired level by controlling the amount and type of the plasticizer in the composition, and film-forming conditions. The tensile modulus of elasticity is preferably set at 1500 MPa or less. This gives good usability to the films in the applications such as trash bags, agricultural mulch films, stretch films, films for labels, films for tapes, films for protecting base materials, films for bags, and packaging films. In addition, the above configuration easily gives sufficient adhesion to the films when they are used as wrap films for food packaging, since the films sufficiently deform in accordance with the shape of a material to be packaged. By setting the tensile modulus of elasticity at 100 MPa or more, the resulting films can be satisfactorily unwound when they are wound as a roll, and can pass through the film-forming and processing processes.

The films derived from the poly(lactic acid) polymer compositions of the first, second and third embodiments preferably each have a heat resistance of 120° C. to 230° C. The heat resistance of the films is determined according to a method described in the examples. The films having a heat resistance of 120° C. or higher are substantially free from adhesion to a heating roller during film-formation and stretching, adhesion to members during heat setting, and blocking after film-formation and are excellent in process stability. In addition, the resulting films when used as wrap films for food packaging are substantially free from breaking, or melting and deposition onto an article to be packaged, even when they are brought into contact with hot water or heated in a microwave oven.

The films derived from the poly(lactic acid) polymer compositions of the first, second and third embodiments each mainly comprise the poly(lactic acid) polymer. The melting point of the poly(lactic acid) is generally at highest 230° C., and the upper limit of the heat resistance of the films is pursuant to this.

A poly(L-lactic acid) has a melting point of about 170° C. even at an optical purity of 98% or more. In contrast, a "stereo complex crystal" has a melting point of about 220° C. to about 230° C. In the stereo complex crystal, poly(lactic acid) molecules of optical isomers (for example, a poly(L-lactic acid) and a poly(D-lactic acid)) constitute the crystal in a pair. A combination use of, for example, a poly(L-lactic acid) and a poly(D-lactic acid) each having an optical purity of 95% or more as the poly(lactic acid) polymer is preferred to impart heat resistance of higher than 170° C. to formed plastics, typically films, derived from the poly(lactic acid) polymer compositions of the first, second and third embodiments.

The formed plastics, especially a film, derived from the poly(lactic acid) polymer composition of the first embodiments may have a configuration in which the poly(lactic acid) polymer is, for example, a poly(L-lactic acid) having an optical purity of 95% or more, and the poly(lactic acid) segment of the plasticizer is one comprising 98 percent by weight or more of a component derived from D-lactic acid.

The poly(lactic acid) polymer compositions of the first, second and third embodiments each preferably contain equivalent amounts or substantially equivalent amounts of a component derived from L-lactic acid and a component derived from D-lactic acid, in order to further accelerate the formation of the stereo complex crystal in the formed plastics, especially films, derived from the compositions.

The films derived from the poly(lactic acid) polymer compositions of the first, second and third embodiments inherently have satisfactory transparency and preferably each have a film haze of 0.2% to 5%. The film haze herein refers to a film haze which is measured by a method described in the examples and is converted in terms of a film thickness of 10 μm according to a proportional calculation. A film having a film haze of 0.2% to 5% is suitable as a packaging wrap film, typically as a wrap film for food packaging, since the content can be easily seen. For use in applications which require certain masking property or require a low optical transmittance or a high absorptivity with respect to solar light, as in trash bags and agricultural mulch films, coloring pigments, for example, may be added according to necessity.

The films derived from the poly(lactic acid) polymer compositions of the first, second and third embodiments preferably each have an adhesion of 5 to 30 N/cm$^2$. The adhesion herein is determined by a method described in the examples. A film having an adhesion of 5 to 30 N/cm$^2$ is suitably used as a wrap film for food packaging. The resulting packaging wrap film is free from spontaneous peeling off during use due to insufficient adhesion and is free from deteriorated releasability from a roll due to blocking. It can be smoothly taken out from a roll, exhibits appropriate adhesiveness in use and has satisfactory usability.

The thickness of the films derived from the poly(lactic acid) polymer compositions of the first, second and third embodiments is not specifically limited and can be set at an appropriate thickness according to the application. The thickness of the films is generally 5 μm or more and 1 mm or less, and is preferably 5 μm or more and 200 μm or less. As packaging wrap films, typically as wrap films for food packaging, the thickness is preferably set within a range of 5 μm or more and 25 μm or less.

The films derived from the poly(lactic acid) polymer compositions of the first, second and third embodiments may be subjected to surface treatment after film-formation for the purpose of improving, for example, printability, lamination suitability or coating suitability. Examples of the surface treatment are corona discharge treatment, plasma treatment, flame treatment and acid treatment, and any of them can be used. Among them, corona discharge treatment is most preferable as the surface treatment, since corona discharge treatment can be carried out continuously and easily, and facilities for the treatment can be easily arranged in already existed film-forming facilities.

EXAMPLES

This disclosure will be illustrated in further detail with reference to several examples below, which are not intended to limit the scope of the appended claims.

In the following examples,.the weight loss rate after dry heat treatment and the weight loss rate after treatment with hot water were determined as accelerating tests on the evaporation, migration and extraction (bleedout) of a plasticizer. The physical properties in the examples were determined by the following methods.

(1) Bending Modulus of Elasticity [MPa]

A bending test (Japanese Industrial Standards (JIS) K 6911) was carried out using a Tensilon universal tester Model RTC-1310 (ORIENTEC CO.). A test piece 12 mm wide and 6 mm thick was subjected to the-test in an atmosphere at 30° C. at a distance between clamps of 120 mm and a test speed of 3 mm/min.

(2) Weight Loss Rate After Dry Heat Treatment [%]

After subjecting to moisture conditioning at a temperature of 23° C. and relative humidity of 65% for one day or longer, a sample pressed sheet or biaxially stretched film was weighed to determine a weight before heat treatment. Next, the sample was treated in a hot-air oven at 90° C. for 30 minutes, was then subjected to moisture conditioning under the same conditions as before the treatment and was weighed. The weight loss rate was determined as a percentage of change in weight (weight loss) between before and after the treatment based on the weight before the treatment.

(3) Weight Loss Rate After Hot-Water Treatment [%]

After subjecting to moisture conditioning at a temperature of 23° C. and relative humidity of 65% for one day or longer, a sample pressed sheet or biaxially stretched film was weighed to determine a weight before heat treatment. Next, the sample was treated in distilled water at 90° C. for 30 minutes, was then subjected to moisture conditioning under the same conditions as before the treatment and was weighed. The weight loss rate was determined as a percentage of change in weight (weight loss) between before and after the treatment based the weight before the treatment.

(4) Transparency Retention Temperature [° C.]

A test sample pressed sheet or film was attached under a tension without wrinkle to an aluminum frame having an inside size of 150 mm square, was fixed to the frame using a plurality of alligator clips for stationary and was left in a hot-air oven held at a set temperature for 30 minutes. The sample was then taken out from the oven and was visually observed. The test procedure was repeated while changing the set temperature of the hot-air oven in steps of 5° C. In this procedure, the transparency retention temperature was defined as a highest temperature at which the sample did not undergo losing transparency and showed no change in transparency.

(5) Heat of Crystal Fusion ($\Delta H_{po}$) [J/g]

A sample plasticizer was subjected in advance to treatment at 90° C. under a reduced pressure of 1 torr or less for 3 hours for sufficient drying and crystallization. If the plasticizer has a melting point of 90° C. or lower, the sample plasticizer was subjected to measurement without the drying and crystallization treatment. About 5 mg of the sample was precisely weighed, was charged into a predetermined sample pan and was subjected to temperature elevation from −30° C. to 220° C. at a rate of 20° C./min in an atmosphere of nitrogen using a differential scanning calorimeter (DSC) RDC 220 available from Seiko Instruments Inc. The heat of crystal fusion derived from a poly(lactic acid) segment of the plasticizer was read out from the resulting thermograph.

(6) Tensile Modulus of Elasticity [MPa]

A sample film piece 10 mm wide and 150 mm long was subjected to moisture conditioning at a temperature of 23° C. and relative humidity of 65% for one day or longer in advance. The resulting film piece was subjected to a tensile test at 23° C. and at a distance between clamps of 50 mm and a tensile speed of 300 mm/min., using a Tensilon universal tester Model UTC-100 (ORIENTEC CO.) to determine a tensile modulus of elasticity. The measuring procedure was repeated a total of ten times, namely, five times in a longitudinal direction and five times in a widthwise direction per one level. In this procedure, the tensile modulus of elasticity was defined as the average of ten measurements.

(7) Heat Resistance [° C]

A test sample pressed sheet or film was attached under a tension without wrinkle to an aluminum frame having an inside size of 150 mm square, was fixed to the frame using a plurality of alligator clips for stationary, and was left in a hot-air oven held at a set temperature for 5 minutes. The sample was then taken out from the oven and was visually observed. The test procedure was repeated while changing the set temperature of the hot-air oven in steps of 5° C. In this procedure, the temperature indicating the heat resistance was defined as a highest temperature at which the sample did not show a change such as breakage or fusion to the frame.

(8) Film Haze [%]

The thickness of a sample film was determined in advance, and the haze of the sample film as an index of transparency thereof was determined using a Haze meter Model HGM-2DP (a product of Suga Test Instruments). The measurement procedure was repeated a total of five times per one level, and the film haze (%) was determined in terms of a film 10 μm thick based on the average of the five measurements.

(9) Adhesion [N/cm$^2$]

A pair of two film pieces 10 mm wide and 100 mm long was prepared and was subjected to humidity conditioning at a temperature of 23° C. and relative humidity of 65% for one day or longer. Subsequently, a portion 10 mm in a longitudinal direction from the edge of one film piece was laid over a portion 10 mm in a longitudinal direction from the edge of the other film piece under the same atmosphere so that the longitudinal direction of one film piece met with that of the other. A load of 50 g/cm2 was applied to the overlaid portion for one minute to thereby yield a test sample for measurement of adhesion. The adhesion was determined using a Tensilon universal tester Model UTC-100 (ORIENTEC CO.). The above-mentioned test sample was set into the tester so that the overlaid portion stood substantially at the center between clamps. A tensile test was carried out at a distance between the clamps of 50 mm and a tensile speed of 300 mm/min. in an atmosphere of 23° C., and a stress immediately before the overlaid portion peeled off was measured. When the film pieces had a relatively low tensile strength and another portion than the overlaid portion was broken before the overlaid portion peeled off, each two thicknesses were fully overlaid to give test pieces, and a pair of two overlaid test pieces were subjected to the above mentioned test procedure. The measurement procedure was repeated a total of five times per one level, and the adhesion was defined as an average of the five measurements.

Poly(lactic acid) polymers and plasticizers used in the examples were prepared in the following manner.

<Poly(lactic acid) polymer (P1)>

A total of 0.02 part by weight of tin octylate was added to 100 parts by weight of L-lactide, followed by polymerization at 190° C. in an atmosphere of nitrogen for 15 minutes in a reactor equipped with a stirrer. The reaction mixture was formed into chips using a double-screw kneader-extruder, followed by solid-phase polymerization at 140° C. in an atmosphere of nitrogen for 3 hours to thereby yield a poly(lactic acid) polymer P1. P1 was subjected to DSC measurement and was found to exhibit crystallinity and to have a crystallization temperature of 128° C. and a melting point of 172° C.

<Poly(lactic acid) polymer (P2)>

A total of 0.02 part by weight of tin octylate was added to 65 parts by weight of L-lactide and 35 parts by weight of DL-lactide, followed by polymerization at 190° C. in an atmosphere of nitrogen for 40 minutes in a reactor equipped with a stirrer. The reaction mixture was formed into chips using a double-screw kneader-extruder to yield a poly(lactic acid) polymer P2. P2 was subjected to DSC measurement and was found that P2 did not exhibit crystallinity and that no crystallization temperature and melting point were observed.

<Poly(lactic acid) polymer (P3)>

A total of 0.02 part by weight of tin octylate was added to 86 parts by weight of L-lactide and 14 parts by weight of DL-lactide, followed by polymerization at 190° C. in an atmosphere of nitrogen for 40 minutes in a reactor equipped with a stirrer. The reaction mixture was formed into chips using a double-screw kneader-extruder to yield a poly(lactic acid) polymer P3. P3 was subjected to DSC measurement and was found to exhibit crystallinity and to have a melting point of 141° C.

<Plasticizer (S1)>

A total of 0.025 part by weight of tin octylate was added to 40 parts by weight of a poly(1,3,-butanediol adipate) having an average molecular weight of 8,000 and 60 parts by weight of L-lactide, followed by polymerization at 190° C. in an atmosphere of nitrogen for 60 minutes in a reactor equipped with a stirrer, to yield a block copolymer Si between poly(1,3-butanediol-adipate) and poly(lactic acid). The block copolymer had poly(lactic acid) segments each having an average molecular weight of 6000 at both ends. S1 was found to have a $\Delta H_{po}$ of 23.3 J/g and a peak temperature in $\Delta H_{po}$ of 145.0° C.

<Plasticizer (S2)>

A total of 0.025 part by weight of tin octylate was added to 71 parts by weight of a poly(1,3-butanediol adipate) having an average molecular weight of 10000and 29 parts by weight of L-lactide, followed by polymerization at 190° C. in an atmosphere of nitrogen for 60 minutes in a reactor equipped with a stirrer, to yield a block copolymer S2 between poly(1,3-butanediol adipate) and poly(lactic acid). The block copolymer had poly(lactic acid) segments each having an average molecular weight of 2,000 at both ends. S2 was found to have a $\Delta H_{po}$ of 11.4 J/g and a peak temperature in $\Delta H_{po}$ of 124.1° C.

<Plasticizer (S3)>

A poly(propylene glycol)/(ethylene glycol) block copolymer having a molecular weight of 10000 was prepared by adding ethylene oxide to both ends of a poly(propylene glycol) having an average molecular weight of 2000. A total of 0.025 part by weight of tin octylate was added to 71 parts by weight of the block copolymer and 29 parts by weight of L-lactide, followed by polymerization at 190° C. in an atmosphere of nitrogen for 60 minutes in a reactor equipped with a stirrer, to yield a block copolymer S3 between poly(propylene glycol)/(ethylene glycol) and poly(lactic acid). The resulting block copolymer had poly(lactic acid) segments each having an average molecular weight of 2000 at both ends. S3 was found to have a $\Delta H_{po}$ of 15.8 J/g and a peak temperature in $\Delta H_{po}$ of 131.8° C.

<Plasticizer (S4)>

A total of 0.025 part by weight of tin octylate was added to 71 parts by weight of a poly(ethylene glycol) having an average molecular weight of 10000 and 29 parts by weight of L-lactide, followed by polymerization at 190° C. in an atmosphere of nitrogen for 60 minutes in a reactor equipped with a stirrer, to yield a block copolymer S4 between poly(ethylene glycol) and poly(lactic acid). The block copolymer had poly(lactic acid) segments each having an average molecular weight of 2000 at both ends. S4 was found to have a $\Delta H_{po}$ of 17.0 J/g and a peak temperature in $\Delta H_{po}$ of 135.0° C.

<Plasticizer (S5)>

An ether ester plasticizer "RS-1000" (liquid at room temperature), a product of Asahi Denka Kogyo K. K., was used as a plasticizer S5.

<Plasticizer (S6)>

A poly(ethylene glycol) having an average molecular weight of 8000 was used as a plasticizer S6.

<Plasticizer (S7)>

A total of 0.025 part by weight of tin octylate was added to 80 parts by weight of a poly(ethylene glycol) having an average molecular weight of 8000 and 20 parts by weight of L-lactide, followed by polymerization at 190° C. in an atmosphere of nitrogen for 60 minutes in a reactor equipped with a stirrer, to yield a block copolymer S7 between poly(ethylene glycol) and poly(lactic acid). The block copolymer had poly(lactic acid) segments each having an average molecular weight of 1000 at both ends. The $\Delta H_{po}$ of S7 was not observed.

<Plasticizer (S8)>

A total of 0.025 part by weight of tin octylate was added to 79 parts by weight of a poly(ethylene glycol) having an average molecular weight of 10000 and 21 parts by weight of L-lactide, followed by polymerization at 190° C. in an atmosphere of nitrogen for 60 minutes in a reactor equipped with a stirrer, to yield a block copolymer S8 between poly(ethylene glycol) and poly(lactic acid). The block copolymer had poly(lactic acid) segments each having an average molecular weight of 1300 at both ends. S8 was found to have a $\Delta H_{po}$ of 9.2 J/g and a peak temperature in $\Delta H_{po}$ of 122.0° C.

The number-average molecular weight of the poly(lactic acid) segment was found to be 1260 as determined by calculation according to the following equation:

$$\text{Number-average molecular weight} = (\tfrac{1}{2}) \times (I_{PLA} \times 72) / (I_{PEG} \times 44/4) \times M_{PEG}$$

wherein $I_{PEG}$ is the integrated intensity of signals derived from hydrogen of the methylene group of the principal chain of PEG; $I_{PLA}$ is the integrated intensity of signals derived from hydrogen of the methine group of the principal chain of PLA; and $M_{PEG}$ is the average molecular weight of the poly (ethylene glycol), based on a chart obtained by subjecting a solution of the plasticizer (S8) in deuterium chloroform to 1H-NMR measurement. This value very satisfactorily corresponded to a value calculated according to the formula:

$$(½) \times (w_A/w_B) \times M_{PEG}$$

wherein $w_A$ is the parts by weight of L-lactide; $w_B$ is the parts by weight of the poly (ethylene glycol); and $M_{PEG}$ is the average molecular weight of the poly (ethylene glycol), based on the charged proportions of the raw materials.

<Plasticizer (S9)>

A total of 0.025 part by weight of tin octylate was added to 71 parts by weight of a poly(ethylene glycol) monomethyl ether having an average molecular weight of 10000 and 29 parts by weight of L-lactide, followed by polymerization at 190° C. in an atmosphere of nitrogen for 60 minutes in a reactor equipped with a stirrer, to yield a block copolymer S9 between poly(ethylene glycol) and poly(lactic acid). The block copolymer had a poly(lactic acid) segment having an average molecular weight of 4000 at one end. S9 was found to have a $\Delta H_{po}$ of 21.8 J/g and a peak temperature in $\Delta H_{po}$ of 134.8° C.

<Inorganic Particle (F1)>

A commercially available calcium carbonate powder was used as an inorganic particle F1.

Example 1

A mixture of 50 parts by weight of the poly(lactic acid) polymer (P1) and 50 parts by weight of the plasticizer (S1) was dried at 100° C. under reduced pressure for 6 hours, was melted, kneaded and homogenized in a double-screw kneader-extruder at a cylinder temperature of 200° C., and the kneaded product was extruded into chips to yield a chip-form composition. The resulting composition was optically transparent.

This composition was molded into a test piece for bending modulus of elasticity 12 mm wide and 6 mm thick using an injection molding machine at a barrel temperature of 200° C. and a die temperature of 20° C. The composition was also molded into a pressed sheet 200 μm thick by hot pressing at 190° C. The properties of the test piece and the pressed sheet were determined, and the results are shown in Table 1.

Example 2

A chip-form composition was prepared by the procedure of Example 1, except for using a mixture of 72 parts by weight of the poly(lactic acid) polymer (P1) and 28 parts by weight of the plasticizer. (S2). The resulting composition was optically transparent, This composition was molded into a test piece for bending modulus of elasticity by the procedure of Example 1. The composition was also molded into a pressed sheet 200 μm thick by hot pressing at 190° C. The properties of the test piece and the pressed sheet were determined, and the results are shown in Table 1.

Example 3

A chip-form composition was prepared by the procedure of Example 1, except for using a mixture of 51 parts by weight of the poly(lactic acid) polymer (P1) and 49 parts by weight of the plasticizer (S2). The resulting composition was slightly opaque but substantially optically transparent.

This composition was molded into a test piece for bending modulus of elasticity by the procedure of Example 1. The composition was also molded into a pressed sheet 200 μm thick by hot pressing at 190° C. The properties of the test piece and the pressed sheet were determined, and the results are shown in Table 1.

Example 4

A chip-form composition was prepared by the procedure of Example 1, except for using a mixture of 72 parts by weight of the poly(lactic acid) polymer (P1), 28 parts by weight of the plasticizer (S3) and 0.3 part by weight of a hindered phenol antioxidant "Irganox 1010", a product of Ciba-Geigy Ltd. The resulting composition was optically transparent.

This composition was molded into a test piece for bending modulus of elasticity by the procedure of Example 1. The composition was also molded into a pressed sheet 200 μm thick by hot pressing at 190° C. The properties of the test piece and the pressed sheet were determined, and the results are shown in Table 1.

Example 5

A chip-form composition was prepared by the procedure of Example 1, except for using a mixture of 94 parts by weight of the poly(lactic acid) polymer (P1), 6 parts by weight of the plasticizer (S3) and 0.3 part by weight of a hindered phenol antioxidant "Irganox 1010", a product of Ciba-Geigy Ltd. The resulting composition was optically transparent.

This composition was molded into a test piece for bending modulus of elasticity by the procedure of Example 1. The composition was also molded,into a pressed sheet 200 μm thick by hot pressing at 190° C. The properties of the test piece and the pressed sheet were determined, and the results are shown in Table 1.

Example 6

A chip-form composition was prepared by the procedure of Example 1, except for using a mixture of 72 parts by weight-of the poly(lactic acid) polymer (P1), 28 parts by weight of the plasticizer (S4) and 0.3 part by weight of a hindered phenol antioxidant "Irganox 1010", a product of Ciba-Geigy Ltd. The resulting composition was optically transparent.

This composition was molded into a test piece for bending modulus of elasticity by the procedure of Example 1. The composition was also molded into a pressed sheet 200 μm thick by hot pressing at 190° C. The properties of the test piece and the pressed sheet were determined, and the results are shown in Table 1.

Example 7

A pressed sheet was prepared by the procedure of Example 6 and was subjected to simultaneous biaxial stretching at a stretching temperature of 70° C., draw ratios in longitudinal and transverse directions of each 3.2 times and an areal ratio of 10 times, followed by heat treatment in an atmosphere at 140° C. for 20 seconds to yield a biaxially stretched film. The resulting biaxially stretched film was optically transparent. The properties of the biaxially stretched film were determined, and the results are shown in Table 1.

Example 8

A chip-form composition was prepared by the procedure of Example 1, except for using a mixture of 75 parts by weight of-the poly(lactic acid) polymer (P1), 25 parts by weight of the plasticizer (S8) and 0.3 part by weight of a hindered phenol antioxidant "Irganox 1010", a product of Ciba-Geigy Ltd. The resulting composition was optically transparent.

This composition was molded into a test piece for bending modulus of elasticity by the procedure of Example 1. The composition was also molded into a pressed sheet 200 µm thick by hot pressing at 190° C. The properties of the test piece and the pressed sheet were determined, and the results are shown in Table 1.

Example 9

A mixture of 37 parts by weight of the poly(lactic acid) polymer (P1) and 28 parts-by weight of the plasticizer (S4) both of which had been dried at 100° C. under reduced pressure for 6 hours, 35 parts by weight of the poly(lactic acid) polymer (P2) which had been dried at 50° C. under reduced pressure for 48 hours or longer, and 0.3 part by weight of a hindered phenol antioxidant "Irganox 1010", a product of Ciba-Geigy Ltd., was melted, kneaded and homogenized in a double-screw kneader-extruder at a cylinder temperature of 200° C., and the kneaded product was extruded into chips to yield a chip-form composition. The resulting composition was optically transparent.

This composition was molded into a test piece for bending modulus of elasticity by the procedure of Example 1. The composition was also molded into a pressed sheet 200 µm thick by hot pressing at 190° C. The properties of the test piece and the pressed sheet were determined, and the results are shown in Table 1.

Example 10

A chip-form composition was prepared by the procedure of Example 9, except for using a mixture of 45 parts by weight of the poly(lactic acid) polymer (P1) which had been dried at 100° C. under reduced pressure for 6 hours, 20 parts by weight of the plasticizer (S6), 35 parts by weight of the poly(lactic acid) polymer (P2) which had been dried at 50° C. under reduced pressure for 48 hours or longer, and 0.3 part by weight of a hindered phenol antioxidant "Irganox 1010", a product of Ciba-Geigy Ltd. The resulting composition was optically transparent.

This composition was molded into a test piece for bending modulus of elasticity by the procedure of Example 1. The composition was also molded into a pressed sheet 200 µm thick by hot pressing at 190° C. The properties of the test piece and the pressed sheet were determined, and the results are shown in Table 2.

Example 11

A chip-form composition was prepared by the procedure of Example 9, except for using a mixture of 80 parts by weight of the poly(lactic acid) polymer (P3)-which had been dried at 80° C. under reduced pressure for 12 hours, 20 parts by weight of the plasticizer (S6) and 0.3 part by weight of a hindered phenol antioxidant "Irganox 1010", a product of Ciba-Geigy Ltd. The resulting composition was optically transparent.

This composition was molded into a test piece for bending modulus of elasticity by the procedure of Example 1. The composition was also molded into a pressed sheet 200 µm thick by hot pressing at 190° C. The properties of the test piece and the pressed sheet were determined, and the results are shown in Table 3.

Example 12

A composition was prepared by the procedure of Example 6, except for using the plasticizer (S9) instead of the plasticizer (S4). The resulting composition was optically transparent. This composition was molded into a test piece for bending modulus of elasticity by the procedure of Example 1. The composition was also molded into a pressed sheet 200 µm thick by hot pressing at 190° C. The properties of the test piece and the pressed sheet were determined, and the results are shown in Table 1.

Example 13

A chip-form composition was prepared by the procedure of Example 9, except for using a mixture of 72 parts by weight of the poly(lactic acid) polymer (P2) which had been dried at 50° C. under reduced pressure for 48 hours or longer, 28 parts by weight of the plasticizer (S4) which had been dried at 100° C. under reduced pressure for 6 hours, and 0.3 part by weight of a hindered phenol antioxidant "Irganox 1010", a product of Ciba-Geigy Ltd. The resulting composition was optically transparent.

This composition was molded into a test piece for bending modulus of elasticity by the procedure of Example 1. The composition was also molded into a pressed sheet 200 µm thick by hot pressing at 190° C. The properties of the test piece and the pressed sheet were determined, and the results are shown in Table 4.

Comparative Example 1

A test piece for bending modulus of elasticity was prepared by the procedure of Example 1, except for using the poly(lactic acid) polymer (P1) alone without the use of the plasticizer. The composition was also molded into a pressed sheet 200 µm thick by hot pressing at 190° C. The properties of the test piece and the pressed sheet were determined, and the results are shown in Tables 1, 2, 3 and 4.

Comparative Example 2

A mixture of 80 parts by weight of the poly(lactic acid) polymer (P1) which had been dried at 100° C. under reduced pressure for 6 hours and 20 parts by weight of the commercially available ether ester plasticizer (S5) was melted, kneaded and homogenized in a double-screw kneader-extruder at a cylinder temperature of 200° C., and the kneaded product was extruded into chips to yield a chip-form composition. The resulting composition was optically transparent.

This composition was molded into a test piece for bending modulus of elasticity 12 mm wide and 6 mm thick using an injection molding machine at a barrel temperature of 200° C. and a die temperature of 20° C. The composition was also molded into a pressed sheet 200 µm thick by hot pressing at 190° C. The properties of the test piece and the pressed sheet were determined, and the results are shown in Tables 1, 2, 3 and 4.

Comparative Example 3

A chip-form composition was prepared by the procedure of Comparative Example 2, except for using a mixture of 80 parts by weight of the poly(lactic acid) polymer (P1) which had been dried at 100° C. under reduced pressure for 6 hours, 20 parts by weight of the plasticizer (S6) having no poly(lactic acid) segment having a molecular weight of 1200 or more, and 0.3 part by weight of a hindered phenol antioxidant "Irganox 1010", a product of Ciba-Geigy Ltd. Neither the poly(lactic acid) polymer (P2) exhibiting no crystallinity nor the poly(lactic acid) polymer (P3) exhibiting crystallinity and having a melting point lower than 145° C. was added. The resulting composition was optically transparent.

This composition was molded into a test piece for bending modulus of elasticity by the procedure of Example 1. The composition was also molded into a pressed sheet 200 μm thick by hot pressing at 190° C. The properties of the test piece and the pressed sheet were determined, and the results are shown in Tables 1, 2, 3 and 4.

Comparative Example 4

A chip-form composition was prepared by the procedure of Comparative Example 2, except for using a mixture of 75 parts by weight of the poly(lactic acid) polymer (P1) which had been dried at 100° C. under reduced pressure for 6 hours, 25 parts by weight of the plasticizer (S7) having no poly(lactic acid) segment having a molecular weight of 1200 or more, and 0.3 part by weight of a hindered phenol antioxidant "Irganox 1010", a product of Ciba-Geigy Ltd. Neither the poly(lactic acid) polymer (P2) exhibiting no crystallinity nor the poly(lactic acid) polymer (P3) exhibiting crystallinity and having a melting point lower than 145° C. was added. The resulting composition was optically transparent.

This composition was molded into a test piece for bending modulus of elasticity by the procedure of Example 1. The composition was also molded into a pressed sheet 200 μm thick by hot pressing at 190° C. The properties of the test piece and the pressed sheet were determined, and the results are shown in Tables 1, 2, 3 and 4.

Comparative Example 5

A pressed sheet was prepared by the procedure of Comparative Example 4 and was subjected to simultaneous biaxial stretching at a stretching temperature of 70° C., draw ratios in longitudinal and transverse directions of each 3.2 times and an areal ratio of 10 times, followed by heat treatment in an atmosphere at 140° C. for 20 seconds to yield a biaxially stretched film. The resulting biaxially stretched film was optically transparent. The properties of the biaxially stretched film were determined, and the results are shown in Tables 1, 2, 3 and 4.

TABLE 1

| | Poly (lactic acid) polymer//plasticizer (weight percentage) | Molecular weight of poly (lactic acid) segment in plasticizer | Weight percentage of poly (lactic acid) segment in plasticizer [weight %] | Weight percentage of plasticizing component in composition [weight %] | Bending modulus of elasticity [MPa] | Weight loss after dry heat treatment [%] | Weight loss after hot-water treatment [%] | Transparency retention temperature [° C.] |
|---|---|---|---|---|---|---|---|---|
| Ex. 1 | P1//S1 (50//50) | 6000 | 60 | 20 | 911 | 0.8 | 1.3 | 110 |
| Ex. 2 | P1//S2 (72//28) | 2000 | 29 | 20 | 957 | 0.9 | 1.4 | 115 |
| Ex. 3 | P1//S2 (51//49) | 2000 | 29 | 35 | 636 | 1.2 | 1.7 | 105 |
| Ex. 4 | P1//S3 (72//28) | 2000 | 29 | 20 | 192 | 0.6 | 0.9 | 120 |
| Ex. 5 | P1//S3 (94//6) | 2000 | 29 | 4 | 694 | 0.2 | 0.2 | 130 |
| Ex. 6 | P1//S4 (72//28) | 2000 | 29 | 20 | 44 | 0.4 | 0.7 | 120 |
| Ex. 7 | P1//S4 (72//28) | 2000 | 29 | 20 | — | 0.2 | 0.2 | 110 |
| Ex. 8 | P1//S8 (75//25) | 1300 | 21 | 20 | 60 | 0.7 | 1.1 | 120 |
| Ex. 9 | P1/P2//S4 (37/35/28) | 2000 | 29 | 20 | 40 | 0.5 | 0.8 | 125 |
| Ex. 12 | P1//S9 (72//28) | 4000 | 29 | 20 | 71 | 0.3 | 0.8 | 120 |
| Com. Ex. 1 | P1 (100) | — | — | 0 | 2550 | 0.1 | 0.1 | ≧140 |
| Com. Ex. 2 | P1//S5 (80//20) | 0 | 0 | 20 | 111 | 0.4 | 19.2 | 90 |
| Com. Ex. 3 | P1//S6 (80//20) | 0 | 0 | 20 | 52 | 2.5 | 3.8 | 90 |
| Com. Ex. 4 | P1//S7 (75//25) | 1000 | 20 | 20 | 46 | 2.3 | 3.4 | 90 |
| Com. Ex. 5 | P1//S7 (75//25) | 1000 | 20 | 20 | — | 2.2 | 3.1 | 85 |

TABLE 2

| | Poly (lactic acid) polymer//plasticizer (weight percentage) | Molecular weight of poly (lactic acid) segment in plasticizer | Weight percentage of poly (lactic acid) segment in plasticizer [weight %] | Weight percentage of plasticizing component in composition [weight %] | Bending modulus of elasticity [MPa] | Weight loss after dry heat treatment [%] | Weight loss after hot-water treatment [%] | Transparency retention temperature [° C.] |
|---|---|---|---|---|---|---|---|---|
| Ex. 10 | P1/P2//S6 (45/35//20) | 0 | 0 | 20 | 49 | 1.7 | 2.0 | 125 |
| Com. Ex. 1 | P1 (100) | — | — | 0 | 2550 | 0.1 | 0.1 | ≧140 |
| Com. Ex. 2 | P1//S5 (80//20) | 0 | 0 | 20 | 111 | 0.4 | 19.2 | 90 |

TABLE 2-continued

|  | Poly (lactic acid) polymer//plasticizer (weight percentage) | Molecular weight of poly (lactic acid) segment in plasticizer | Weight percentage of poly (lactic acid) segment in plasticizer [weight %] | Weight percentage of plasticizing component in composition [weight %] | Bending modulus of elasticity [MPa] | Weight loss after dry heat treatment [%] | Weight loss after hot-water treatment [%] | Transparency retention temperature [° C.] |
|---|---|---|---|---|---|---|---|---|
| Com. Ex. 3 | P1//S6 (80//20) | 0 | 0 | 20 | 52 | 2.5 | 3.8 | 90 |
| Com. Ex. 4 | P1//S7 (75//25) | 1000 | 20 | 20 | 46 | 2.3 | 3.4 | 90 |
| Com. Ex. 5 | P1//S7 (75//25) | 1000 | 20 | 20 | — | 2.2 | 3.1 | 85 |

TABLE 3

|  | Poly (lactic acid) polymer//plasticizer (weight percentage) | Molecular weight of poly (lactic acid) segment in plasticizer | Weight percentage of poly (lactic acid) segment in plasticizer [weight %] | Weight percentage of plasticizing component in composition [weight %] | Bending modulus of elasticity [MPa] | Weight loss after dry heat treatment [%] | Weight loss after hot-water treatment [%] | Transparency retention temperature [° C.] |
|---|---|---|---|---|---|---|---|---|
| Ex. 11 | P3//S6 (80//20) | 0 | 0 | 20 | 55 | 1.6 | 1.9 | 105 |
| Com. Ex. 1 | P1 (100) | — | — | 0 | 2550 | 0.1 | 0.1 | ≧140 |
| Com. Ex. 2 | P1//S5 (80//20) | 0 | 0 | 20 | 111 | 0.4 | 19.2 | 90 |
| Com. Ex. 3 | P1//S6 (80//20) | 0 | 0 | 20 | 52 | 2.5 | 3.8 | 90 |
| Com. Ex. 4 | P1//S7 (75//25) | 1000 | 20 | 20 | 46 | 2.3 | 3.4 | 90 |
| Com. Ex. 5 | P1//S7 (75//25) | 1000 | 20 | 20 | — | 2.2 | 3.1 | 85 |

TABLE 4

|  | Poly (lactic acid) polymer//plasticizer (weight percentage) | Molecular weight of poly (lactic acid) segment in plasticizer | Weight percentage of poly (lactic acid) segment in plasticizer [weight %] | Weight percentage of plasticizing component in composition [weight %] | Bending modulus of elasticity [MPa] | Weight loss after dry heat treatment [%] | Weight loss after hot-water treatment [%] | Transparency retention temperature [° C.] |
|---|---|---|---|---|---|---|---|---|
| Ex. 13 | P2//S4 (72//28) | 2000 | 29 | 20 | 46 | 2.1 | 3.0 | ≧140 |
| Com. Ex. 1 | P1 (100) | — | — | 0 | 2550 | 0.1 | 0.1 | ≧140 |
| Com. Ex. 2 | P1//S5 (80//20) | 0 | 0 | 20 | 111 | 0.4 | 19.2 | 90 |
| Com. Ex. 3 | P1//S6 (80//20) | 0 | 0 | 20 | 52 | 2.5 | 3.8 | 90 |
| Com. Ex. 4 | P1//S7 (75//25) | 1000 | 20 | 20 | 46 | 2.3 | 3.4 | 90 |
| Com. Ex. 5 | P1//S7 (75//25) | 1000 | 20 | 20 | — | 2.2 | 3.1 | 85 |

Example 14

A mixture of 57 parts by weight of the poly(lactic acid) polymer (P1) and 43 parts by weight of the plasticizer (S2), both of which had been dried at 100° C. under reduced pressure for 6 hours, was melted, kneaded and homogenized in a double-screw kneader-extruder at a cylinder temperature of 200° C., and the kneaded product was extruded into chips to yield a chip-form composition. The resulting composition was optically transparent. The composition (chips) was dried at 80° C. under reduced pressure for 24 hours or longer before subjecting to the following film-formation.

The chips were melted in a single-screw extruder at a set melting temperature of 210° C., the melted polymer was introduced to a T-die head to extrude into a sheet, the sheet was cast on a drum cooled at about 5° C. and thereby yielded an unstretched film. The unstretched film was continuously stretched 3.5 times in a longitudinal direction between heating rolls at 60° C. and was then stretched in a widthwise direction at 65° C. at a set draw ratio of 3.0 times using a tenter stretching apparatus, followed by heat treatment at 130° C. under a tension. The resulting film was wound up. The resulting film had a thickness of 12 micron.

The properties of the biaxially stretched film were determined, and the results are shown in Table 5.

Example 15

A biaxially stretched film was prepared by the procedure of Example 14, except for using a mixture of 72 parts by weight of the poly(lactic acid) polymer (P1) and 28 parts by weight of the plasticizer (S3). The resulting film had a thickness of 15 micron.

The properties of the biaxially stretched film were determined, and the results are shown in Table 5.

Example 16

A biaxially stretched film was prepared by the procedure of Example 14, except for using a-mixture of 86 parts by weight of the poly(lactic acid) polymer (P1), 14 parts by weight of the plasticizer (S4) and 0.3 part by weight of a hindered phenol antioxidant "Irganox 1010", a product of Ciba-Geigy Ltd. The resulting film had a thickness of 40 micron.

The properties of the biaxially stretched film were determined, and the results are shown in Table 5.

Example 17

A biaxially stretched film was prepared by the procedure of Example 14, except for using a mixture of 72 parts by weight of the poly(lactic acid) polymer (P1), 28 parts by weight of the plasticizer (S4) and 0.3 part by weight of a hindered phenol antioxidant "Irganox 1010", a product of Ciba-Geigy Ltd. The resulting film had a thickness of 18 micron.

The properties of the biaxially stretched film were determined, and the results are shown in Table 5.

Example 18

A biaxially stretched film was prepared by the procedure of Example 14, except for using a mixture of 70 parts by weight of the poly(lactic acid) polymer (P1), 28 parts by weight of the plasticizer (S4), 2 parts by weight of the inorganic particle (F1) and 0.3 part by weight of a hindered phenol antioxidant "Irganox 1010", a product of Ciba-Geigy Ltd. The resulting film had a thickness of 38 micron.

The properties of the biaxially stretched film were determined, and the results are shown in Table 5.

Example 19

A mixture of 17 parts by weight of the poly(lactic acid) polymer (P1) and 28 parts by weight of the plasticizer (S4) both of which had been dried at 100° C. under reduced pressure for 6 hours, 55 parts by weight of the poly(lactic acid) polymer (P2) which had been dried at 50° C. under reduced pressure for 48 hours or longer, and 0.3 part by weight of a hindered phenol antioxidant "Irganox 1010", a product of Ciba-Geigy Ltd., was melted, kneaded and homogenized in a double-screw kneader-extruder at a cylinder temperature of 200° C., and the kneaded product was extruded into chips to yield a chip-form composition. The composition (chips) was dried at 70° C. under reduced pressure for 24 hours or longer and was subjected to the following film-formation.

The chips were melted in a single-screw extruder at a set melting temperature of 210° C., the melted polymer was introduced to a circular die, was extruded into a tube and was rapidly cooled using cold water at about 5° C. The cooled tube was subjected to simultaneous biaxial stretching at draw ratios of 4 times in a longitudinal direction and 4 times in a widthwise direction under heating at 55° C. by a tubular film process. The stretched film was allowed to pass through a heat treatment zone set at a predetermined temperature. The resulting film was wound up. The resulting film had a thickness of 12 micron.

The properties of the biaxially stretched film were determined, and the results are shown in Table 5.

Example 20

A biaxially stretched film was prepared by the procedure of Example 19, except for using a mixture of 27 parts by weight of the poly(lactic acid) polymer (P1) and 43 parts by weight of the plasticizer (S4) both of which had been dried at 100° C. under reduced pressure for 6 hours, 30 parts by weight of the poly(lactic acid) polymer (P2) which had been dried at 50° C. under reduced pressure for 48 hours or longer, and 0.3 part by weight of a hindered phenol antioxidant "Irganox 1010", a product of Ciba-Geigy Ltd. The resulting film had a thickness of 12 micron.

The properties of the biaxially stretched film were determined, and the results are shown in Table 5.

Example 21

A biaxially stretched film was prepared by the procedure of Example 14, except for using a mixture of 75 parts by weight of the poly(lactic acid) polymer (P1), 25 parts by weight of the plasticizer (S8) and 0.3 part by weight of a hindered phenol antioxidant "Irganox 1010", a product of Ciba-Geigy Ltd. The resulting film had a thickness of 18 micron.

The properties of the biaxially stretched film were determined, and the results are shown in Table 5.

Example 22

A biaxially stretched film was prepared by the procedure of Example 19, except for using a mixture of 37 parts by weight of the poly(lactic acid) polymer (P1) and 28 parts by weight of the plasticizer (S4) both of which had been dried at 100° C. under reduced pressure for 6 hours, 35 parts by weight of the poly(lactic acid) polymer (P2) which had been dried at 50° C. under reduced pressure for 48 hours or longer and 0.3 part by weight of a hindered phenol antioxidant "Irganox 1010", a product of Ciba-Geigy Ltd. The resulting film had a thickness of 18 micron.

The properties of the biaxially stretched film were determined, and the results are shown in Table 5.

Example 23

A biaxially stretched film was prepared by the procedure of Example 19, except for using a mixture of 45 parts by weight of the poly(lactic acid) polymer (P1) which had been dried at 100° C. under reduced pressure for 6 hours, 20 parts by weight of the plasticizer (S6), 35 parts by weight of the poly(lactic acid) polymer (P2) which had been dried at 50° C. under reduced-pressure for 48 hours or longer and 0.3 part by weight of a hindered phenol antioxidant "Irganox 1010", a product of Ciba-Geigy Ltd. The resulting film had a thickness of 15 micron.

The properties of the biaxially stretched film were determined, and the results are shown in Table 6.

Example 24

A biaxially stretched film was prepared by the procedure of Example 19, except for using a mixture of 80 parts by weight of the poly(lactic acid) polymer (P3) which had been dried at 80° C. under reduced pressure for 12 hours, 20 parts by weight of the plasticizer (S6) and 0.3 part by weight of a hindered phenol antioxidant "Irganox 1010", a product of Ciba-Geigy Ltd. The resulting film had a thickness of 15 micron.

The properties of the biaxially stretched film were determined, and the results are shown in Table 7.

Example 25

A pressed sheet was prepared by the procedure of Example 13 and was subjected to simultaneous biaxial stretching at a stretching temperature of 55° C., draw ratios in longitudinal and transverse directions of each 3.2 times and an areal ratio of 10 times to yield a biaxially stretched film.

The properties of the biaxially stretched film were determined, and the results are shown in Table 8.

Comparative Example 6

The poly(lactic acid) polymer (P1) which had been dried at 100° C. under reduced pressure for 12 hours or longer was used alone without the addition of a plasticizer and was melted in a single-screw extruder at a set melting temperature of 210° C., the melted polymer was introduced to a T-die head having a slit width of 1.0 mm and was extruded into a sheet. The sheet was cast on a drum cooled at about 15° C. and thereby yielded an unstretched film. The unstretched film was continuously stretched 3.5 times in a longitudinal direction between heating rolls at 85° C. and was then stretched in a widthwise direction at 80° C. at a set draw ratio of 3.5 times using a tenter stretching apparatus, followed by heat treatment at 140° C. under a tension. The resulting film was wound up. The resulting film had a thickness of 20 micron.

The properties of the biaxially stretched film were determined, and the results are shown in Tables 5, 6, 7 and 8.

Comparative Example 7

The poly(lactic acid) polymer (P1) was dried at 100° C. under reduced pressure for 12 hours or longer. Next, the commercially available ether ester plasticizer (S5) was continuously weighed and added to the poly(lactic acid) polymer (P1) while melting the poly(lactic acid) polymer (P1) at 200° C. in a double-screw extruder so that 25 parts by weight of (S5) was added to 75 parts by weight of (P1). The mixture was melted, kneaded and homogenized, and the kneaded product was extruded into chips to yield a chip-form composition. The chips were dried at 80° C. under reduced pressure for 24 hours or longer and was subjected to the following film-formation.

The chips were melted in a single-screw extruder at a set melting temperature of 210° C., the melted polymer was introduced to a circular die, was extruded into a tube, the tube was rapidly cooled using cold water at about 5° C. The cooled tube was subjected to simultaneous biaxial stretching at draw ratios of 4 times in a longitudinal direction and 4 times in a widthwise direction under heating at 60° C. by a tubular film process. The stretched film was allowed to pass through a heat treatment zone at a predetermined temperature and was wound up. The resulting film had a thickness of 12 micron.

The properties of the biaxially stretched film were determined, and the results are shown in Tables 5, 6, 7 and 8.

Comparative Example 8

A mixture of 75 parts by weight of the poly(lactic acid) polymer (P1) which had been dried at 100° C. under reduced pressure for 6 hours, 25 parts by weight of the plasticizer (S6), and 0.3 part by weight of a hindered phenol antioxidant "Irganox 1010", a product of Ciba-Geigy Ltd., was melted, kneaded and homogenized in a double-screw kneader-extruder at a cylinder temperature of 200° C., and the kneaded product was extruded into chips to yield a chip-form composition. Neither the poly(lactic acid) polymer (P2) exhibiting no crystallinity nor the poly(lactic acid) polymer (P3) exhibiting crystallinity and having a melting point lower than 145° C. was added. After drying at 80° C. under reduced pressure for 24 hours or longer, the chips were formed into a biaxially stretched film by the procedure of Comparative Example 7. The resulting film had a thickness of 12 micron.

The properties of the biaxially stretched film were determined, and the results are shown in Tables 5, 6, 7 and 8.

Comparative Example 9

A mixture of 67 parts by weight of the poly(lactic acid) polymer (P1) which had been dried at 100° C. under reduced pressure for 6 hours, 33 parts by weight of the plasticizer (S7) and 0.3 part by weight of a hindered phenol antioxidant "Irganox 1010", a product of Ciba-Geigy Ltd., was melted, kneaded and homogenized in a double-screw kneader-extruder at a cylinder temperature of 200° C., and the kneaded product was extruded into chips to yield a chip-form composition. Neither the poly(lactic acid) polymer (P2) exhibiting no crystallinity nor the poly(lactic acid) polymer (P3) exhibiting crystallinity and having a melting point lower than 145° C. was added. After drying at 80° C. under reduced pressure for 24 hours or longer, the chips were formed into a biaxially stretched film by the procedure of Comparative Example 7. The resulting film had a thickness of 12 micron.

The properties of the biaxially stretched film were determined, and the results are shown in Tables 5, 6, 7 and 8.

TABLE 5

| | Poly (lactic acid) polymer// plasticizer// particle (weight percentage) | Molecular weight of poly (lactic acid) segment in plasticizer | Weight percentage of poly (lactic acid) segment in plasticizer [weight %] | Weight percentage of plasticizing component in composition [weight %] | Weight loss after dry heat treatment [%] | Weight loss after hot-water treatment [%] | Transparency retention temperature [° C.] | Tensile modulus of elasticity [MPa] | Heat resistance [° C.] | Film haze [%] | Adhesion [N/cm$^2$] |
|---|---|---|---|---|---|---|---|---|---|---|---|
| Ex. 14 | P1//S2 (57//43) | 2000 | 29 | 31 | 0.4 | 0.5 | 105 | 1732 | 155 | 6.0 | 0.0 |
| Ex. 15 | P1//S3 (72//28) | 2000 | 29 | 20 | 0.3 | 0.4 | 115 | 1750 | 155 | 1.0 | 0.0 |
| Ex. 16 | P1//S4 (86//14) | 2000 | 29 | 10 | 0.2 | 0.2 | 120 | 1461 | 155 | 0.7 | 0.0 |
| Ex. 17 | P1//S4 (72//28) | 2000 | 29 | 20 | 0.2 | 0.3 | 115 | 980 | 155 | 0.9 | 4.1 |
| Ex. 18 | P1//S4//F1 (70//28//2) | 2000 | 29 | 20 | 0.2 | 0.4 | — | 1055 | 155 | 24.2 | 0.0 |
| Ex. 19 | P1//P2//S4 (17/55//28) | 2000 | 29 | 20 | 0.5 | 0.9 | ≧140 | 550 | 145 | 0.7 | 8.3 |
| Ex. 20 | P1//P2//S4 (27/30//43) | 2000 | 29 | 31 | 0.7 | 1.0 | 115 | 355 | 150 | 1.2 | 12.6 |

TABLE 5-continued

|  | Poly (lactic acid) polymer// plasticizer// particle (weight percentage) | Molecular weight of poly (lactic acid) segment in plasticizer | Weight percentage of poly (lactic acid) segment in plasticizer | Weight percentage of plasticizing component in composition [weight %] | Weight loss after dry heat treatment [%] | Weight loss after hot-water treatment [%] | Transparency retention temperature [° C.] | Tensile modulus of elasticity [MPa] | Heat resistance [° C.] | Film haze [%] | Adhesion [N/cm²] |
|---|---|---|---|---|---|---|---|---|---|---|---|
| Ex. 21 | P1//S8 (75//25) | 1300 | 21 | 20 | 0.9 | 1.5 | 110 | 840 | 155 | 1.0 | 4.1 |
| Ex. 22 | P1/P2//S4 (37/35//28) | 2000 | 29 | 20 | 0.3 | 0.5 | 125 | 661 | 155 | 1.0 | 6.9 |
| Com. Ex. 6 | P1 (100) | — | — | 0 | 0.1 | 0.1 | ≧140 | 3226 | 160 | 0.6 | 0.0 |
| Com. Ex. 7 | P1//S5 (75//25) | 0 | 0 | 25 | 0.6 | 24.2 | 85 | 889 | 155 | 0.8 | 7.2 |
| Com. Ex. 8 | P1//S6 (75//25) | 0 | 0 | 25 | 3.1 | 6.1 | 85 | 627 | 155 | 0.9 | 7.9 |
| Com. Ex. 9 | P1//S7 (67//33) | 1000 | 20 | 26 | 2.9 | 6.0 | 80 | 554 | 155 | 1.8 | 8.0 |

TABLE 6

|  | Poly (lactic acid) polymer// plasticizer// particle (weight percentage) | Molecular weight of poly (lactic acid) segment in plasticizer | Weight percentage of poly (lactic acid) segment in plasticizer | Weight percentage of plasticizing component in composition [weight %] | Weight loss after dry heat treatment [%] | Weight loss after hot-water treatment [%] | Transparency retention temperature [° C.] | Tensile modulus of elasticity [MPa] | Heat resistance [° C.] | Film haze [%] | Adhesion [N/cm²] |
|---|---|---|---|---|---|---|---|---|---|---|---|
| Ex. 23 | P1/P2//S6 (45/35//20) | 0 | 0 | 20 | 1.8 | 2.1 | 125 | 605 | 155 | 0.7 | 9.0 |
| Com. Ex. 6 | P1 (100) | — | — | 0 | 0.1 | 0.1 | ≧140 | 3226 | 160 | 0.6 | 0.0 |
| Com. Ex. 7 | P1//S5 (75//25) | 0 | 0 | 25 | 0.6 | 24.2 | 85 | 889 | 155 | 0.8 | 7.2 |
| Com. Ex. 8 | P1//S6 (75//25) | 0 | 0 | 25 | 3.1 | 6.1 | 85 | 627 | 155 | 0.9 | 7.9 |
| Com. Ex. 9 | P1//S7 (67//33) | 1000 | 20 | 26 | 2.9 | 6.0 | 80 | 554 | 155 | 1.8 | 8.0 |

TABLE 7

|  | Poly (lactic acid) polymer// plasticizer// particle (weight percentage) | Molecular weight of poly (lactic acid) segment in plasticizer | Weight percentage of poly (lactic acid) segment in plasticizer | Weight percentage of plasticizing component in composition [weight %] | Weight loss after dry heat treatment [%] | Weight loss after hot-water treatment [%] | Transparency retention temperature [° C.] | Tensile modulus of elasticity [MPa] | Heat resistance [° C.] | Film haze [%] | Adhesion [N/cm²] |
|---|---|---|---|---|---|---|---|---|---|---|---|
| Ex. 24 | P3//S6 (80//20) | 0 | 0 | 20 | 1.9 | 1.9 | 105 | 895 | 110 | 0.9 | 6.6 |
| Com. Ex. 6 | P1 (100) | — | — | 0 | 0.1 | 0.1 | ≧140 | 3226 | 160 | 0.6 | 0.0 |
| Com. Ex. 7 | P1//S5 (75//25) | 0 | 0 | 25 | 0.6 | 24.2 | 85 | 889 | 155 | 0.8 | 7.2 |
| Com. Ex. 8 | P1//S6 (75//25) | 0 | 0 | 25 | 3.1 | 6.1 | 85 | 627 | 155 | 0.9 | 7.9 |
| Com. Ex. 9 | P1//S7 (67//33) | 1000 | 20 | 26 | 2.9 | 6.0 | 80 | 554 | 155 | 1.8 | 8.0 |

TABLE 8

|  | Poly (lactic acid) polymer// plasticizer// particle (weight percentage) | Molecular weight of poly (lactic acid) segment in plasticizer | Weight percentage of poly (lactic acid) segment in plasticizer | Weight percentage of plasticizing component in composition [weight %] | Weight loss after dry heat treatment [%] | Weight loss after hot-water treatment [%] | Transparency retention temperature [° C.] | Tensile modulus of elasticity [MPa] | Heat resistance [° C.] | Film haze [%] | Adhesion [N/cm²] |
|---|---|---|---|---|---|---|---|---|---|---|---|
| Ex. 25 | P2//S4 (72//28) | 2000 | 29 | 20 | 2.5 | 4.5 | ≧140 | 521 | 70 | 0.9 | 7.1 |
| Com. Ex. 6 | P1 (100) | — | — | 0 | 0.1 | 0.1 | ≧140 | 3226 | 160 | 0.6 | 0.0 |

TABLE 8-continued

|  | Poly (lactic acid) polymer// plasticizer// particle (weight percentage) | Molecular weight of poly (lactic) acid) segment in plasticizer | Weight percentage of poly (lactic acid) segment in plasticizer [weight %] | Weight percentage of plasticizing component in composition [weight %] | Weight loss after dry heat treatment [%] | Weight loss after hot-water treatment [%] | Trans- parency retention temperature [° C.] | Tensile modulus of elasticity [MPa] | Heat resis- tance [° C.] | Film haze [%] | Adhesion [N/cm²] |
|---|---|---|---|---|---|---|---|---|---|---|---|
| Com. Ex. 7 | P1//S5 (75//25) | 0 | 0 | 25 | 0.6 | 24.2 | 85 | 889 | 155 | 0.8 | 7.2 |
| Com. Ex. 8 | P1//S6 (75//25) | 0 | 0 | 25 | 3.1 | 6.1 | 85 | 627 | 155 | 0.9 | 7.9 |
| Com. Ex. 9 | P1//S7 (67//33) | 1000 | 20 | 26 | 2.9 | 6.0 | 80 | 554 | 155 | 1.8 | 8.0 |

Example 26

Potato salad was placed in a glass bowl, and an opening of the bowl was covered by the film according to Example 19 as a wrap film. The wrap film was in intimate contact with the opening of the bowl along the curve thereof and fully covered and sealed the opening of the bowl even after the hand was left, showing good handleability.

The wrap film kept its intimate contact even after storing in a refrigerator for one week as it was and showed no surface tackiness.

Cold rice was placed in a bowl, was covered by the above-mentioned film and was heated in a microwave oven. The film was then observed to find that the film did not break, was not fused to the bowl, did not change in its transparency as compared with that before heating and did not show surface tackiness.

Example 27

A total of five high of four bags each containing 25 kg of poly(lactic acid) chips were piled up on a wood pallet. The film according to Example 22 as a pallet stretch film was wound around the piled paper bags. The film sufficiently elongated and deformed well along the shape of the piled paper bags. The film did not spontaneously unwind after winding and showed sufficient adhesion, indicating good handleability.

Example 28

A film was prepared by the procedure of Example 18, except for changing the thickness to 25 μm. The film was placed in agricultural land in Shiga Prefecture in Japan in the same manner as in a commercially available agricultural mulch film. This film showed appropriate flexibility and could be easily placed along the shape of the soil without portions out of the soil. The film did not break and did not left wrinkled even when the film-was trampled during the placing procedure.

The film showed substantially equal flexibility to that immediately after placing and did not show breakage or surface tackiness even after left stand for three months. After left stand for nine months, the film partially broken and scattered into pieces as a result of decomposition. The soil was tilled together with the film using a tiller. The film was easily pulverized and turned up into the soil.

Example 29

A pressure-sensitive adhesive label was prepared by dissolving 5 parts by weight of naturally occurring rubber and 1 part by weight of naturally occurring rosin in 94 parts by weight of toluene, applying the solution to the film according to Example 18 as a base film and drying the applied solution to form a pressure-sensitive adhesive layer 15 μm thick thereon. A paper label on an empty beer bottle was fully removed, and the surface of the beer bottle was sufficiently washed and dried. Then the above-prepared label was applied to a surface of the beer bottle to find that the label itself finely followed the curve of the beer bottle and came in intimate contact therewith. In this procedure, the label was applied so that part thereof covered the shoulders of the beer bottle. The label showed appropriate extensibility, finely followed the curve of the beer bottle and came in intimate contact therewith.

Example 30

A pressure-sensitive adhesive tape was prepared in the following manner. A solution was prepared by dissolving 5 parts by weight of naturally occurring rubber and 1 part by weight of naturally occurring rosin in 94 parts by weight of toluene. The solution was applied to the film according to Example 16 as a base film and was dried to form a pressure-sensitive adhesive layer 15 μm thick thereon. A release film comprising a poly(vinyl alcohol) (PVA) film was then applied to the surface of the pressure-sensitive adhesive layer under pressure and thereby yielded the pressure-sensitive adhesive tape. Packing was carried out using the above-prepared tape to find that the tape showed sufficient extensibility, finely followed the curve of an article to be packaged and showed satisfactory handleability.

Example 31

A trash bag was prepared by forming raw materials having the same composition as in Example 18 into a film 20 μm thick by blown film extrusion, and cutting and heat-sealing the resulting film. This trash bag was used for refuse disposal instead of a commercially available polyethylene trash bag to find that the trash bag showed appropriate flexibility and masking property and could be handled satisfactorily without break to form a hole or tearing in a bending portion.

Example 32

A film was prepared by the procedure of Example 16, except for setting the temperature in heat treatment after stretching at 60° C. and setting the thickness of the film at 18 μm. A commercially available disposable lunchbox was packaged by heat-sealing three sides of the above-prepared film. The lunchbox comprised a lid member made of a biaxially stretched polystyrene and a body member made of a talc-containing polypropylene (PP). The packaged lunchbox was subjected to heat treatment in a hot-air oven at an inside temperature of 100° C. for about 1 minute. As a result, the film deformed in accordance with the shape of the lunchbox due to heat shrinkage to thereby package the entire lunchbox without irregular shrinkage or surface waviness of the film. The film neither broke nor fused to the lunchbox. In addition, the film showed equivalent transparency to that before heat treatment and did not show surface tackiness.

INDUSTRIAL APPLICABILITY

The poly(lactic acid) polymer compositions exhibit satisfactory flexibility and show very small amount of the evaporation, migration and extraction (bleedout) of plasticizers and losing transparency upon heating in use as formed plastics, which properties have not yet been achieved by conventional technologies. The poly(lactic acid) polymer compositions are usable in a wide variety of applications, for example, as formed plastics such as packaging wrap films and other films.

In addition, the poly(lactic acid) polymer compositions exhibit biodegradability in natural environment higher than conventional plastics and can be relatively easily degraded in natural environment after use. The poly(lactic acid) polymer compositions are very useful for solving environmental issues caused by plastic wastes.

The invention claimed is:

1. A film formed from a formed plastic comprising a poly(lactic acid) polymer composition comprising a) a poly(lactic acid) polymer exhibiting crystallinity, and b) a plasticizer having at least one poly(lactic acid) segment with a number-average molecular weight of 1200 or more per molecule and a polyether segment, and wherein the film has a tensile modulus of elasticity of 100 to 1500 MPa.

2. A film formed from a formed plastic comprising a poly(lactic acid) polymer composition comprising a) a poly(lactic acid) polymer exhibiting crystallinity, b) a poly(lactic acid) polymer exhibiting no crystallinity, and c) a plasticizer having a polyether segment and having no poly(lactic acid) segment with a number-average molecular weight of 1200 or more, and wherein the film has a tensile modulus of elasticity of 100 to 1500 MPa.

3. A film formed from a formed plastic comprising a poly(lactic acid) polymer composition comprising a) a poly(lactic acid) polymer exhibiting crystallinity and having a melting point lower than 145° C., and b) a plasticizer having a polyether segment and having no poly(lactic acid) segment with a number-average molecular weight of 1200 or more, and wherein the film has a tensile modulus of elasticity of 100 to 1500 MPa.

4. The film according to claim 1, in which the plasticizer comprising a polyether segment has at least one poly(lactic acid) segment having a number-average molecular weight of 1500 or more per molecule.

5. The film according to claim 1 or 3, further comprising a poly(lactic acid) polymer exhibiting no crystallinity.

6. The film according to any one of claims 1, 2 and 3, in which the weight percentage of the poly(lactic acid) segment component of the plasticizer is less than 50 percent by weight of the total of the plasticizer.

7. The film according to any one of claims 1, 2 and 3, in which the weight percentage of a plasticizing component except the poly(lactic acid) segment component of the plasticizer is 5 percent by weight or more and 30 percent by weight or less of the total of the composition.

8. The film according to any one of claims 1, 2 and 3, in which the plasticizer has a segment comprising a poly(alkylene ether).

9. The film according to claim 8, in which the poly(alkylene ether) is a poly(ethylene glycol).

10. The film of any one of claims 1, 2 and 3, in which the composition has been stretched 1.1 times or more in at least one axial direction.

11. The film according to any one of claims 1, 2 and 3, in which the film has a heat resistance of 120° C. to 230° C.

12. The film according to any one of claims 1, 2 and 3, in which the film has a film haze of 0.2 to 5 percent.

13. The film according to any one of claims 1, 2 and 3, in which the film has an adhesion of 5 to 30 N/cm$^2$.

14. The film according to any one of claims 1, 2 and 3, in which the film is selected from a packaging wrap film, a stretch film, an agricultural film, a film for label, a film for tape, a film for protecting a base material and a film for bag.

15. A film formed from a formed plastic comprising a poly(lactic acid) polymer composition comprising a) a poly(lactic acid) polymer exhibiting no crystallinity, and b) a plasticizer comprising a polyether segment, the composition containing no poly(lactic acid) polymer exhibiting crystallinity, and the film has a tensile modulus of elasticity of 100 to 1500 MPa.

* * * * *

UNITED STATES PATENT AND TRADEMARK OFFICE
CERTIFICATE OF CORRECTION

PATENT NO. : 7,351,785 B2
APPLICATION NO. : 10/517999
DATED : April 1, 2008
INVENTOR(S) : Matsumoto et al.

It is certified that error appears in the above-identified patent and that said Letters Patent is hereby corrected as shown below:

On the Title Page:

At (57), please replace the Abstract with the following:

--Poly(lactic acid) polymer compositions of the invention each contain an appropriate poly(lactic acid) polymer and a suitable plasticizer having a polyether and/or polyester segment in combination, exhibit satisfactory flexibility and show very small amount of the evaporation, migration and extraction (bleedout) of the plasticizer and losing transparency upon heating. The poly(lactic acid) polymer compositions of the invention are useful as formed plastics such as films.--

At Column 1:

Before "Technical Field" please insert --This applications is a 371 of PCT/JP03/07808 filed 06/19/2003.--

Signed and Sealed this

Tenth Day of February, 2009

JOHN DOLL
*Acting Director of the United States Patent and Trademark Office*